US012626116B2

(12) United States Patent
Hack et al.

(10) Patent No.: US 12,626,116 B2
(45) Date of Patent: May 12, 2026

(54) INTEGRATED OPTICAL NEUROMORPHIC COMPUTING APPARATUS

(71) Applicants: Universal Display Corporation, Ewing, NJ (US); The Trustees of Princeton University, Princeton, NJ (US)

(72) Inventors: Michael Hack, Carmel, CA (US); Paul Prucnal, Princeton, NJ (US); Thomas Ferreira de Lima, Princeton, NJ (US); Michael S. Weaver, Princeton, NJ (US); Simon Bilodeau, Princeton, NJ (US)

(73) Assignees: Universal Display Corporation, Ewing, NJ (US); THE TRUSTEES OF PRINCETON UNIVERSITY, Princeton, NJ (US)

( * ) Notice: Subject to any disclaimer, the term of this patent is extended or adjusted under 35 U.S.C. 154(b) by 1214 days.

(21) Appl. No.: 17/360,155

(22) Filed: Jun. 28, 2021

(65) Prior Publication Data

US 2021/0406668 A1      Dec. 30, 2021

Related U.S. Application Data

(60) Provisional application No. 63/045,660, filed on Jun. 29, 2020.

(51) Int. Cl.
| | |
|---|---|
| *G06N 3/065* | (2023.01) |
| *G06N 3/067* | (2006.01) |
| *G06N 5/04* | (2023.01) |

(52) U.S. Cl.
CPC ........... *G06N 3/065* (2023.01); *G06N 3/0675* (2013.01); *G06N 5/04* (2013.01)

(58) Field of Classification Search
None
See application file for complete search history.

(56) References Cited

U.S. PATENT DOCUMENTS

| | | | |
|---|---|---|---|
| 4,769,292 A | 9/1988 | Tang |
| 5,013,982 A | 5/1991 | Sasaki |
| 5,087,196 A | 2/1992 | Polanco |
| 5,091,195 A | 2/1992 | Havens |
| 5,247,190 A | 9/1993 | Friend |

(Continued)

FOREIGN PATENT DOCUMENTS

| | | |
|---|---|---|
| WO | 2008057394 A1 | 5/2008 |
| WO | 2010011390 A2 | 1/2010 |

OTHER PUBLICATIONS

Camastra, et al., Machine Learning for Audio, Image and Video Analysis, Springer, Oct. 5, 2007, pp. 1-508 (Year: 2007).*

(Continued)

*Primary Examiner* — Wilbert L Starks
(74) *Attorney, Agent, or Firm* — Butzel Long

(57) ABSTRACT

A hybrid neuromorphic computing device is provided, in which artificial neurons include light-emitting devices that provide weighted sums of inputs as light output. The output is detected by a photodetector and converted to an electrical output. Each neuron may receive output from one or more other neurons as initial input. Interconnects between neurons may be optical, electrical, or a combination thereof. The neurons also may provide imaging sensor and/or display capabilities.

18 Claims, 10 Drawing Sheets

Integrated camera/display/neuromorphic processor

(56) References Cited

U.S. PATENT DOCUMENTS

| | | | |
|---|---|---|---|
| 5,393,994 | A | 2/1995 | Kobayashi |
| 5,703,436 | A | 12/1997 | Forrest |
| 5,707,745 | A | 1/1998 | Forrest |
| 5,834,893 | A | 11/1998 | Bulovic |
| 5,844,363 | A | 12/1998 | Gu |
| 6,013,982 | A | 1/2000 | Thompson |
| 6,087,196 | A | 7/2000 | Sturm |
| 6,091,195 | A | 7/2000 | Forrest |
| 6,097,147 | A | 8/2000 | Baldo |
| 6,294,398 | B1 | 9/2001 | Kim |
| 6,303,238 | B1 | 10/2001 | Thompson |
| 6,337,102 | B1 | 1/2002 | Forrest |
| 6,468,819 | B1 | 10/2002 | Kim |
| 7,279,704 | B2 | 10/2007 | Walters |
| 7,431,968 | B1 | 10/2008 | Shtein |
| 7,968,146 | B2 | 6/2011 | Wagner |
| 2003/0230980 | A1 | 12/2003 | Forrest |
| 2004/0174116 | A1 | 9/2004 | Lu |
| 2012/0184252 | A1 | 7/2012 | Hirsch |
| 2016/0196489 | A1 | 7/2016 | Guillanneuf |
| 2017/0229663 | A1 | 8/2017 | Tsai |
| 2018/0039882 | A1 | 2/2018 | Ikeda |

OTHER PUBLICATIONS

Xiao, et al., Large-scale and energy-efficient tensorized optical neural networks on III-V-on-silicon MOSCAP platform, APL Photonics 6, 126107, Dec. 16, 2021, pp. 1-11 (Year: 2021).*

Quiñonez, et al., Image Recognition in UAV Videos Using Convolutional Neural Networks, IET Software, vol. 14 Iss. 2, pp. 176-181, Apr. 1, 2020 (Year: 2020).*

Nahmias, et al., Photonic Multiply-Accumulate Operations for Neural Networks, IEEE Journal of Selected Topics in Quantum Electronics, vol. 26, No. 1, Feb. 2020 pp. 1-18 (Year: 2020).*

Bai, et al., Towards Silicon Photonic Neural Networks for Artificial Intelligence, Science China: Information Sciences, vol. 63, Jun. 2020, pp. 1-14 (Year: 2020).*

Baldo et al.Highly efficient phosphorescent emission from organic electroluminescent devices, Nature, vol. 395, pp. 151-154, 1998.

Baldo, et al., "Very high-efficiency green organic light-emitting devices based on electrophosphorescence", Applied Physics Letters, Jul. 5, 1999, 4 pp., vol. 75, No. 1, American Institute of Physics, Melville, NY, USA.

Wikipedia, "Autoencoder," available at https://en.wikipedia.org/wiki/Autoencoder, last visited Jun. 9, 2021, 13 pages.

Roland Hany, Marco Cremona & Karen Strassel (2019), "Recent advances with optical upconverters made from all-organic and hybrid materials, Science and Technology of Advanced Materials", 20:1, 497-510, DOI: 10.1080/14686996.2019.1610057, 15 pages.

Ramuz et al., "OLED and OPD-based mini-spectrometer integrated on a single-mode planar waveguide chip", Eur Phys J Appl Phys 46, 2009, 12510, https://doi.org/10.1051/epjap/2009025, 5 pages.

Abbott et al., "Synaptic plasticity: taming the beast", 2000 Nature America Inc., vol. 3, https://doi.org/10.1038/81453, 6 pages.

Watts et al., "Collective dynamics of 'small-warld' networks", Nature, vol. 393, Jun. 4, 1998, https://doi.org/10.1038/30918, 3 pages.

Shastri, et al., "Principles of Neuromorphic Photonics," Department of Electrical Engineering, Princeton University, Princeton, NJ 08544, USA, Emerging Technologies, Optics, Dec. 29, 2017, 28 pages.

* cited by examiner

OBTAIN WEIGHTING FACTOR PAIRS FOR EACH NEURON IN A FIRST ROW OR SET 610

OUTPUT SUM OF WEIGHTED INPUT VALUES BY LIGHT-EMITTING DEVICE 620

DETECT LIGHT OUTPUT AND COMPARE TO THRESHOLD 630

OUTPUT BINARY VALUE BASED UPON OUTPUT AND THRESHOLD 640

Display

GPU

GPU

RAM

ML processor
Sensor
Display

GPU

GPU

RAM

INTEGRATED OPTICAL NEUROMORPHIC COMPUTING APPARATUS

CROSS-REFERENCE TO RELATED APPLICATIONS

This application is a non-provisional of, and claims the priority benefit of U.S. Provisional Patent Application Ser. No. 63/045,660, filed Jun. 29, 2020, the entire contents of which are incorporated herein by reference.

GOVERNMENT SUPPORT

This invention was made with government support under Contract No. HR0011-19-9-0049 awarded by the Defense Advanced Research Projects Agency (DARPA). The government has certain rights in the invention.

FIELD

The present invention relates to devices including neuromorphic computing devices made from artificial neurons, which may also provide imaging and/or display functions within a combined device such as through use of organic light emitting diodes, and devices including the same.

BACKGROUND

Opto-electronic devices that make use of organic materials are becoming increasingly desirable for a number of reasons. Many of the materials used to make such devices are relatively inexpensive, so organic opto-electronic devices have the potential for cost advantages over inorganic devices. In addition, the inherent properties of organic materials, such as their flexibility, may make them well suited for particular applications such as fabrication on a flexible substrate. Examples of organic opto-electronic devices include organic light emitting diodes/devices (OLEDs), organic phototransistors, organic photovoltaic cells, and organic photodetectors. For OLEDs, the organic materials may have performance advantages over conventional materials. For example, the wavelength at which an organic emissive layer emits light may generally be readily tuned with appropriate dopants.

OLEDs make use of thin organic films that emit light when voltage is applied across the device. OLEDs are becoming an increasingly interesting technology for use in applications such as flat panel displays, illumination, and backlighting. Several OLED materials and configurations are described in U.S. Pat. Nos. 5,844,363, 6,303,238, and 5,707,745, which are incorporated herein by reference in their entirety.

One application for phosphorescent emissive molecules is a full color display. Industry standards for such a display call for pixels adapted to emit particular colors, referred to as "saturated" colors. In particular, these standards call for saturated red, green, and blue pixels. Alternatively the OLED can be designed to emit white light. In conventional liquid crystal displays emission from a white backlight is filtered using absorption filters to produce red, green and blue emission. The same technique can also be used with OLEDs. The white OLED can be either a single EML device or a stack structure. Color may be measured using CIE coordinates, which are well known to the art.

As used herein, the term "organic" includes polymeric materials as well as small molecule organic materials that may be used to fabricate organic opto-electronic devices.

"Small molecule" refers to any organic material that is not a polymer, and "small molecules" may actually be quite large. Small molecules may include repeat units in some circumstances. For example, using a long chain alkyl group as a substituent does not remove a molecule from the "small molecule" class. Small molecules may also be incorporated into polymers, for example as a pendent group on a polymer backbone or as a part of the backbone Small molecules may also serve as the core moiety of a dendrimer, which consists of a series of chemical shells built on the core moiety. The core moiety of a dendrimer may be a fluorescent or phosphorescent small molecule emitter. A dendrimer may be a "small molecule," and it is believed that all dendrimers currently used in the field of OLEDs are small molecules.

As used herein, "top" means furthest away from the substrate, while "bottom" means closest to the substrate. Where a first layer is described as "disposed over" a second layer, the first layer is disposed further away from substrate. There may be other layers between the first and second layer, unless it is specified that the first layer is "in contact with" the second layer. For example, a cathode may be described as "disposed over" an anode, even though there are various organic layers in between.

As used herein, "solution processible" means capable of being dissolved, dispersed, or transported in and/or deposited from a liquid medium, either in solution or suspension form.

A ligand may be referred to as "photoactive" when it is believed that the ligand directly contributes to the photoactive properties of an emissive material. A ligand may be referred to as "ancillary" when it is believed that the ligand does not contribute to the photoactive properties of an emissive material, although an ancillary ligand may alter the properties of a photoactive ligand.

As used herein, and as would be generally understood by one skilled in the art, a first "Highest Occupied Molecular Orbital" (HOMO) or "Lowest Unoccupied Molecular Orbital" (LUMO) energy level is "greater than" or "higher than" a second HOMO or LUMO energy level if the first energy level is closer to the vacuum energy level. Since ionization potentials (IP) are measured as a negative energy relative to a vacuum level, a higher HOMO energy level corresponds to an IP having a smaller absolute value (an IP that is less negative). Similarly, a higher LUMO energy level corresponds to an electron affinity (EA) having a smaller absolute value (an EA that is less negative). On a conventional energy level diagram, with the vacuum level at the top, the LUMO energy level of a material is higher than the HOMO energy level of the same material. A "higher" HOMO or LUMO energy level appears closer to the top of such a diagram than a "lower" HOMO or LUMO energy level.

As used herein, and as would be generally understood by one skilled in the art, a first work function is "greater than" or "higher than" a second work function if the first work function has a higher absolute value. Because work functions are generally measured as negative numbers relative to vacuum level, this means that a "higher" work function is more negative. On a conventional energy level diagram, with the vacuum level at the top, a "higher" work function is illustrated as further away from the vacuum level in the downward direction. Thus, the definitions of HOMO and LUMO energy levels follow a different convention than work functions.

More details on OLEDs, and the definitions described above, can be found in U.S. Pat. No. 7,279,704, which is incorporated herein by reference in its entirety.

SUMMARY

According to an embodiment, an organic light emitting diode/device (OLED) is also provided. The OLED can include an anode, a cathode, and an organic layer, disposed between the anode and the cathode. According to an embodiment, the organic light emitting device is incorporated into one or more device selected from a consumer product, an electronic component module, and/or a lighting panel.

According to an embodiment, a neuromorphic optical processing device is provided, which includes a plurality of electrically-connected artificial neurons, each of which includes one or more light-generating components such as OLEDs, microLEDs, or the like, and one or more photodetectors which integrate outputs of the one or more light generating components to an electrical output of the photodetector. Each output of each light-generating components is determined by one or more electrical inputs to the each light-generating component. The photodetector output of each neuron may be provided as one of the one or more electrical inputs of at least one other neuron of the first plurality of neurons. Each photodetector may include a thin film photodetector, which may be disposed within the device such that light emitted by the light-generating component is incident on the thin film photodetector.

DETAILED DESCRIPTION

Generally, an OLED comprises at least one organic layer disposed between and electrically connected to an anode and a cathode. When a current is applied, the anode injects holes and the cathode injects electrons into the organic layer(s). The injected holes and electrons each migrate toward the oppositely charged electrode. When an electron and hole localize on the same molecule, an "exciton," which is a localized electron-hole pair having an excited energy state, is formed. Light is emitted when the exciton relaxes via a photoemissive mechanism. In some cases, the exciton may be localized on an excimer or an exciplex. Non-radiative mechanisms, such as thermal relaxation, may also occur, but are generally considered undesirable.

The initial OLEDs used emissive molecules that emitted light from their singlet states ("fluorescence") as disclosed, for example, in U.S. Pat. No. 4,769,292, which is incorporated by reference in its entirety. Fluorescent emission generally occurs in a time frame of less than 10 nanoseconds.

More recently, OLEDs having emissive materials that emit light from triplet states ("phosphorescence") have been demonstrated. Baldo et al., "Highly Efficient Phosphorescent Emission from Organic Electroluminescent Devices," Nature, vol. 395, 151-154, 1998; ("Baldo-I") and Baldo et al., "Very high-efficiency green organic light-emitting devices based on electrophosphorescence," Appl. Phys. Lett., vol. 75, No. 3, 4-6 (1999) ("Baldo-II"), are incorporated by reference in their entireties. Phosphorescence is described in more detail in U.S. Pat. No. 7,279,704 at cols. 5-6, which are incorporated by reference.

Figure 1:
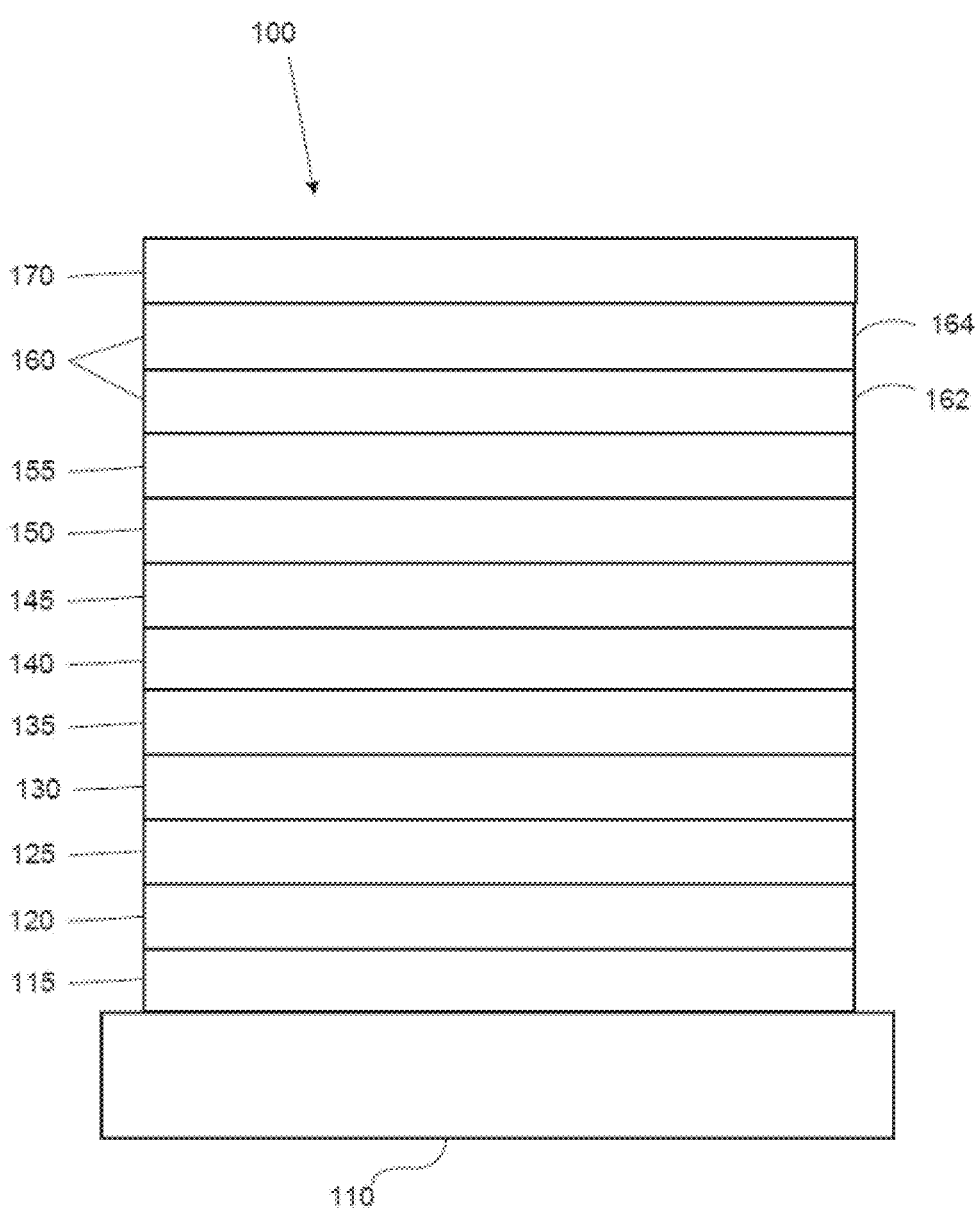
FIG. 1 shows an organic light emitting device suitable for use in embodiments of the present invention, for example as a component of a neuron as disclosed herein.

FIG. 1 shows an organic light emitting device 100. The figures are not necessarily drawn to scale. Device 100 may include a substrate 110, an anode 115, a hole injection layer 120, a hole transport layer 125, an electron blocking layer 130, an emissive layer 135, a hole blocking layer 140, an electron transport layer 145, an electron injection layer 150, a protective layer 155, a cathode 160, and a barrier layer 170. Cathode 160 is a compound cathode having a first conductive layer 162 and a second conductive layer 164. Device 100 may be fabricated by depositing the layers described, in order. The properties and functions of these various layers, as well as example materials, are described in more detail in U.S. Pat. No. 7,279,704 at cols. 6-10, which are incorporated by reference.

More examples for each of these layers are available. For example, a flexible and transparent substrate-anode combination is disclosed in U.S. Pat. No. 5,844,363, which is incorporated by reference in its entirety. An example of a p-doped hole transport layer is m-MTDATA doped with $F_4$-TCNQ at a molar ratio of 50:1, as disclosed in U.S. Patent Application Publication No. 2003/0230980, which is incorporated by reference in its entirety. Examples of emissive and host materials are disclosed in U.S. Pat. No. 6,303,238 to Thompson et al., which is incorporated by reference in its entirety. An example of an n-doped electron transport layer is BPhen doped with Li at a molar ratio of 1:1, as disclosed in U.S. Patent Application Publication No. 2003/0230980, which is incorporated by reference in its entirety. U.S. Pat. Nos. 5,703,436 and 5,707,745, which are incorporated by reference in their entireties, disclose examples of cathodes including compound cathodes having a thin layer of metal such as Mg:Ag with an overlying transparent, electrically-conductive, sputter-deposited ITO layer. The theory and use of blocking layers is described in more detail in U.S. Pat. No. 6,097,147 and U.S. Patent Application Publication No. 2003/0230980, which are incorporated by reference in their entireties. Examples of injection layers are provided in U.S. Patent Application Publication No. 2004/0174116, which is incorporated by reference in its entirety. A description of protective layers may be found in U.S. Patent Application Publication No. 2004/0174116, which is incorporated by reference in its entirety.

Figure 2:
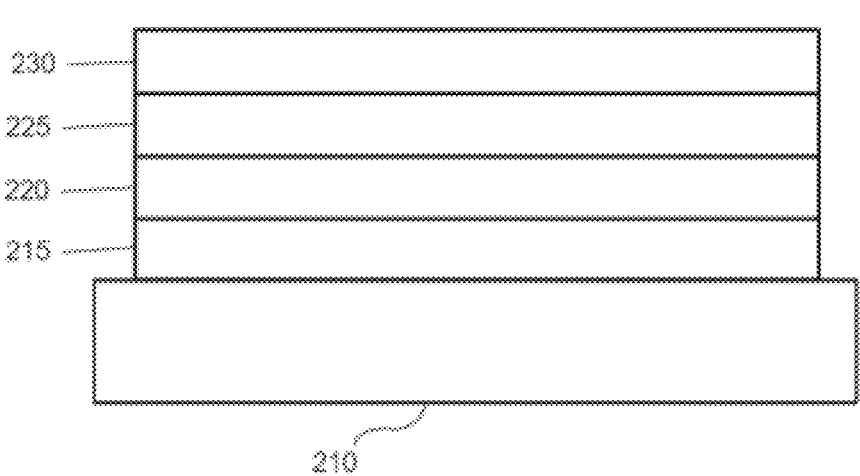
FIG. 2 shows an inverted organic light emitting device that does not have a separate electron transport layer suitable for use in embodiments disclosed herein.

FIG. 2 shows an inverted OLED 200. The device includes a substrate 210, a cathode 215, an emissive layer 220, a hole transport layer 225, and an anode 230. Device 200 may be fabricated by depositing the layers described, in order. Because the most common OLED configuration has a cathode disposed over the anode, and device 200 has cathode 215 disposed under anode 230, device 200 may be referred to as an "inverted" OLED. Materials similar to those described with respect to device 100 may be used in the corresponding layers of device 200. FIG. 2 provides one example of how some layers may be omitted from the structure of device 100.

The simple layered structure illustrated in FIGS. 1 and 2 is provided by way of non-limiting example, and it is understood that embodiments of the invention may be used in connection with a wide variety of other structures. The specific materials and structures described are exemplary in nature, and other materials and structures may be used. Functional OLEDs may be achieved by combining the various layers described in different ways, or layers may be omitted entirely, based on design, performance, and cost factors. Other layers not specifically described may also be included. Materials other than those specifically described may be used. Although many of the examples provided herein describe various layers as comprising a single material, it is understood that combinations of materials, such as a mixture of host and dopant, or more generally a mixture, may be used. Also, the layers may have various sublayers. The names given to the various layers herein are not intended to be strictly limiting. For example, in device 200, hole transport layer 225 transports holes and injects holes into emissive layer 220, and may be described as a hole transport layer or a hole injection layer. In one embodiment, an OLED may be described as having an "organic layer" disposed between a cathode and an anode. This organic layer may comprise a single layer, or may further comprise multiple layers of different organic materials as described, for example, with respect to FIGS. 1 and 2.

Structures and materials not specifically described may also be used, such as OLEDs comprised of polymeric materials (PLEDs) such as disclosed in U.S. Pat. No. 5,247, 190 to Friend et al., which is incorporated by reference in its entirety. By way of further example, OLEDs having a single organic layer may be used. OLEDs may be stacked, for example as described in U.S. Pat. No. 5,707,745 to Forrest et al, which is incorporated by reference in its entirety. The OLED structure may deviate from the simple layered structure illustrated in FIGS. 1 and 2. For example, the substrate may include an angled reflective surface to improve outcoupling, such as a mesa structure as described in U.S. Pat. No. 6,091,195 to Forrest et al., and/or a pit structure as described in U.S. Pat. No. 5,834,893 to Bulovic et al., which are incorporated by reference in their entireties.

Unless otherwise specified, any of the layers of the various embodiments may be deposited by any suitable method. For the organic layers, preferred methods include thermal evaporation, ink-jet, such as described in U.S. Pat. Nos. 6,013,982 and 6,087,196, which are incorporated by reference in their entireties, organic vapor phase deposition (OVPD), such as described in U.S. Pat. No. 6,337,102 to Forrest et al., which is incorporated by reference in its entirety, and deposition by organic vapor jet printing (OVJP), such as described in U.S. Pat. No. 7,431,968, which is incorporated by reference in its entirety. Other suitable deposition methods include spin coating and other solution based processes. Solution based processes are preferably carried out in nitrogen or an inert atmosphere. For the other layers, preferred methods include thermal evaporation. Preferred patterning methods include deposition through a mask, cold welding such as described in U.S. Pat. Nos. 6,294,398 and 6,468,819, which are incorporated by reference in their entireties, and patterning associated with some of the deposition methods such as ink jet and OVJD. Other methods may also be used. The materials to be deposited may be modified to make them compatible with a particular deposition method. For example, substituents such as alkyl and aryl groups, branched or unbranched, and preferably containing at least 3 carbons, may be used in small molecules to enhance their ability to undergo solution processing. Substituents having 20 carbons or more may be used, and 3-20 carbons is a preferred range. Materials with asymmetric structures may have better solution processibility than those having symmetric structures, because asymmetric materials may have a lower tendency to recrystallize. Dendrimer substituents may be used to enhance the ability of small molecules to undergo solution processing.

Devices fabricated in accordance with embodiments of the present invention may further optionally comprise a barrier layer. One purpose of the barrier layer is to protect the electrodes and organic layers from damaging exposure to harmful species in the environment including moisture, vapor and/or gases, etc. The barrier layer may be deposited over, under or next to a substrate, an electrode, or over any other parts of a device including an edge. The barrier layer may comprise a single layer, or multiple layers. The barrier layer may be formed by various known chemical vapor deposition techniques and may include compositions having a single phase as well as compositions having multiple phases. Any suitable material or combination of materials may be used for the barrier layer. The barrier layer may incorporate an inorganic or an organic compound or both. The preferred barrier layer comprises a mixture of a polymeric material and a non-polymeric material as described in U.S. Pat. No. 7,968,146, PCT Pat. Application Nos. PCT/US2007/023098 and PCT/US2009/042829, which are herein incorporated by reference in their entireties. To be considered a "mixture", the aforesaid polymeric and non-polymeric materials comprising the barrier layer should be deposited under the same reaction conditions and/or at the same time. The weight ratio of polymeric to non-polymeric material may be in the range of 95:5 to 5:95. The polymeric material and the non-polymeric material may be created from the same precursor material. In one example, the mixture of a polymeric material and a non-polymeric material consists essentially of polymeric silicon and inorganic silicon.

Devices fabricated in accordance with embodiments of the invention can be incorporated into a wide variety of electronic component modules (or units) that can be incorporated into a variety of electronic products or intermediate components. Examples of such electronic products or intermediate components include display screens, lighting devices such as discrete light source devices or lighting panels, etc. that can be utilized by the end-user product manufacturers. Such electronic component modules can optionally include the driving electronics and/or power source(s). Devices fabricated in accordance with embodiments of the invention can be incorporated into a wide variety of consumer products that have one or more of the electronic component modules (or units) incorporated therein. A consumer product comprising an OLED that includes the compound of the present disclosure in the organic layer in the OLED is disclosed. Such consumer products would include any kind of products that include one or more light source(s) and/or one or more of some type of visual displays. Some examples of such consumer products include flat panel displays, computer monitors, medical monitors, televisions, billboards, lights for interior or exterior illumination and/or signaling, heads-up displays, fully or partially transparent displays, flexible displays, laser printers, telephones, mobile phones, tablets, phablets, personal digital assistants (PDAs), wearable devices, laptop computers, digital cameras, camcorders, viewfinders, micro-displays (displays that are less than 2 inches diagonal), 3-D displays, virtual reality or augmented reality displays, vehicles, video walls comprising multiple displays tiled together, theater or stadium screen, a drone, eyeglasses, an autonomous vehicle, a smart camera, a health-monitoring device, and a sign. Various control mechanisms may be used to control devices fabricated in accordance with the present invention, including passive matrix and active matrix. Many of the devices are intended for use in a temperature range comfortable to humans, such as 18 C to 30 C, and more preferably at room temperature (20-25 C), but could be used outside this temperature range, for example, from −40 C to 80 C.

The materials and structures described herein may have applications in devices other than OLEDs. For example, other optoelectronic devices such as organic solar cells and organic photodetectors may employ the materials and structures. More generally, organic devices, such as organic transistors, may employ the materials and structures.

In some embodiments, the OLED has one or more characteristics selected from the group consisting of being flexible, being rollable, being foldable, being stretchable, and being curved. In some embodiments, the OLED is transparent or semi-transparent. In some embodiments, the OLED further comprises a layer comprising carbon nanotubes.

In some embodiments, the OLED further comprises a layer comprising a delayed fluorescent emitter. In some embodiments, the OLED comprises a RGB pixel arrangement or white plus color filter pixel arrangement. In some embodiments, the OLED is a mobile device, a hand held device, or a wearable device. In some embodiments, the OLED is a display panel having less than 10 inch diagonal or 50 square inch area. In some embodiments, the OLED is a display panel having at least 10 inch diagonal or 50 square inch area. In some embodiments, the OLED is a lighting panel.

In some embodiments of the emissive region, the emissive region further comprises a host.

In some embodiments, the compound can be an emissive dopant. In some embodiments, the compound can produce emissions via phosphorescence, fluorescence, thermally activated delayed fluorescence, i.e., TADF (also referred to as E-type delayed fluorescence), triplet-triplet annihilation, or combinations of these processes.

The OLED disclosed herein can be incorporated into one or more of a consumer product, an electronic component module, and a lighting panel. The organic layer can be an emissive layer and the compound can be an emissive dopant in some embodiments, while the compound can be a non-emissive dopant in other embodiments.

The organic layer can also include a host. In some embodiments, two or more hosts are preferred. In some embodiments, the hosts used may be a) bipolar, b) electron transporting, c) hole transporting or d) wide band gap materials that play little role in charge transport. In some embodiments, the host can include a metal complex. The host can be an inorganic compound.

Combination with Other Materials

The materials described herein as useful for a particular layer in an organic light emitting device may be used in combination with a wide variety of other materials present in the device. For example, emissive dopants disclosed herein may be used in conjunction with a wide variety of hosts, transport layers, blocking layers, injection layers, electrodes and other layers that may be present. The materials described or referred to below are non-limiting examples of materials that may be useful in combination with the compounds disclosed herein, and one of skill in the art can readily consult the literature to identify other materials that may be useful in combination.

Various materials may be used for the various emissive and non-emissive layers and arrangements disclosed herein. Examples of suitable materials are disclosed in U.S. Patent Application Publication No. 2017/0229663, which is incorporated by reference in its entirety.

Conductivity Dopants:

A charge transport layer can be doped with conductivity dopants to substantially alter its density of charge carriers, which will in turn alter its conductivity. The conductivity is increased by generating charge carriers in the matrix material, and depending on the type of dopant, a change in the Fermi level of the semiconductor may also be achieved. Hole-transporting layer can be doped by p-type conductivity dopants and n-type conductivity dopants are used in the electron-transporting layer.

HIL/HTL:

A hole injecting/transporting material to be used in the present invention is not particularly limited, and any compound may be used as long as the compound is typically used as a hole injecting/transporting material.

EBL:

An electron blocking layer (EBL) may be used to reduce the number of electrons and/or excitons that leave the emissive layer. The presence of such a blocking layer in a device may result in substantially higher efficiencies, and or longer lifetime, as compared to a similar device lacking a blocking layer. Also, a blocking layer may be used to confine emission to a desired region of an OLED. In some embodiments, the EBL material has a higher LUMO (closer to the vacuum level) and/or higher triplet energy than the emitter closest to the EBL interface. In some embodiments, the EBL material has a higher LUMO (closer to the vacuum level) and or higher triplet energy than one or more of the hosts closest to the EBL interface. In one aspect, the compound used in EBL contains the same molecule or the same functional groups used as one of the hosts described below.

Host:

The light emitting layer of the organic EL device of the present invention preferably contains at least a metal complex as light emitting material, and may contain a host material using the metal complex as a dopant material. Examples of the host material are not particularly limited, and any metal complexes or organic compounds may be used as long as the triplet energy of the host is larger than that of the dopant. Any host material may be used with any dopant so long as the triplet criteria is satisfied.

HBL:

A hole blocking layer (HBL) may be used to reduce the number of holes and/or excitons that leave the emissive layer. The presence of such a blocking layer in a device may result in substantially higher efficiencies and/or longer lifetime as compared to a similar device lacking a blocking layer. Also, a blocking layer may be used to confine emission to a desired region of an OLED. In some embodiments, the HBL material has a lower HOMO (further from the vacuum level) and or higher triplet energy than the emitter closest to the HBL interface. In some embodiments, the HBL material has a lower HOMO (further from the vacuum level) and or higher triplet energy than one or more of the hosts closest to the HBL interface.

ETL:

An electron transport layer (ETL) may include a material capable of transporting electrons. The electron transport layer may be intrinsic (undoped), or doped. Doping may be used to enhance conductivity. Examples of the ETL material are not particularly limited, and any metal complexes or organic compounds may be used as long as they are typically used to transport electrons.

Charge Generation Layer (CGL)

In tandem or stacked OLEDs, the CGL plays an essential role in the performance, which is composed of an n-doped layer and a p-doped layer for injection of electrons and holes, respectively. Electrons and holes are supplied from the CGL and electrodes. The consumed electrons and holes in the CGL are refilled by the electrons and holes injected from the cathode and anode, respectively; then, the bipolar currents reach a steady state gradually. Typical CGL materials include n and p conductivity dopants used in the transport layers.

Some computing needs such as processing large amounts of data during complex image processing or deep learning applications, may be more suitable for implementation on computing devices that implement neuromorphic principles rather than conventional Von Neumann architecture. Hybrid computing, which uses both analog and digital processes and may combine photonic and electronic processing, may provide enhanced performance over conventional approaches.

Current work in neuromorphic photonic computing such as described, for example, in "Principles of Neuromorphic Photonics," arXiv:1801.00016v1 (Jan. 3, 2018) suggests neuromorphic photonic computing architectures may be based on large scale coupling of optoelectronic neurons. Embodiments disclosed herein provide alternative and additional approaches to neuromorphic computing in which the basic architecture of a display such as a multiplexed flat-panel OLED display or similar device, in which conventional display pixels may be replaced or augmented by electro-optical neurons that include light-emitting devices such as OLEDs, photodetectors such as thin film photodiodes, and control circuitry such as thin film transistors. In contrast to conventional or other current optical neuromorphic computers, in embodiments disclosed herein the light used to perform computations within each neuron is generated within the neurons themselves, as opposed to being generated by lasers or other light sources that are external to the neurons.

Neuromorphic computers work fundamentally differently from conventional Von Neumann computing devices. For example, there are no hard-wired logic connections between output and input stages of logic gates. Instead, neuromorphic computers are designed to mimic the human brain in which a series of processing elements (neurons), respond to a large number of inputs from neighboring neurons, and if the weighted sum of these input signals exceeds a threshold value, then the neuron produces an output. Such an approach may provide noise immunity for highly scalable systems. The weighting factors are tunable, and learning is achieved through tuning of these weighting factors. Using parallel analog weighting circuits and optical analog summation, high-speed system operation may be achieved.

In embodiments disclosed herein, input weighting may be achieved by adjusting the analog output voltage of conventional display data drivers, and learning by adjusting these weighting factors and storing their values in system memory. The weighted output of these data drivers may be used to control the current through, and hence the light output, of an OLED or similar light-emitting device in the neuron. By using the basic framework of a display, such as an OLED display panel, to implement a neuromorphic computer, highly parallel processing available through multiplexing and the highly interconnected nature of the row and column lines (matrix) of a flat panel display may be used to improve processing efficiency, scale, and availability. For example, OLED technology may be used to generate light to implement optical processing in each neuron. Other forms of light-emitting elements such as microLEDs may be used.

In embodiments disclosed herein, emissive components such as OLEDs may be used to provide not only illumination such as for an addressable display or for general purpose illumination, but also for processing. For example, artificial neural networks have recently gained attention as an attractive option for modeling and reproducing the natural processing abilities of a human brain. Such networks typically include a multitude of artificial neurons, each of which may be embodied in one or more nonlinear nodes, which are connected via a network such that information may be transmitted from one neuron to another. In some embodiments disclosed herein, each artificial neuron may receive input from one or more other neurons and may be configured only to activate (or "fire") if the sum of inputs to the neuron exceed a threshold value. As used herein, a "neuron" refers to an artificial neuron, i.e., one that is embodied and implemented in a non-biological device such as a computing and/or display device.

A computing device as disclosed herein may be fabricated on plastic or other suitable rigid or flexible substrate, and may result in extremely high fan-in and fan-out capabilities as disclosed herein. Further, such devices may use existing architectures and/or components and highly manufacturable thin film processes. Since a device as disclosed herein contains photodetectors, the same array may be used as an imaging device and/or artificial intelligence processor to interpret and learn from images being recorded.

Computing devices as disclosed herein also may fabricated on silicon wafers to provide high density and functionality, similar to an OLED microdisplay, with an option of placing the photodetectors on the device lid.

Figure 3:
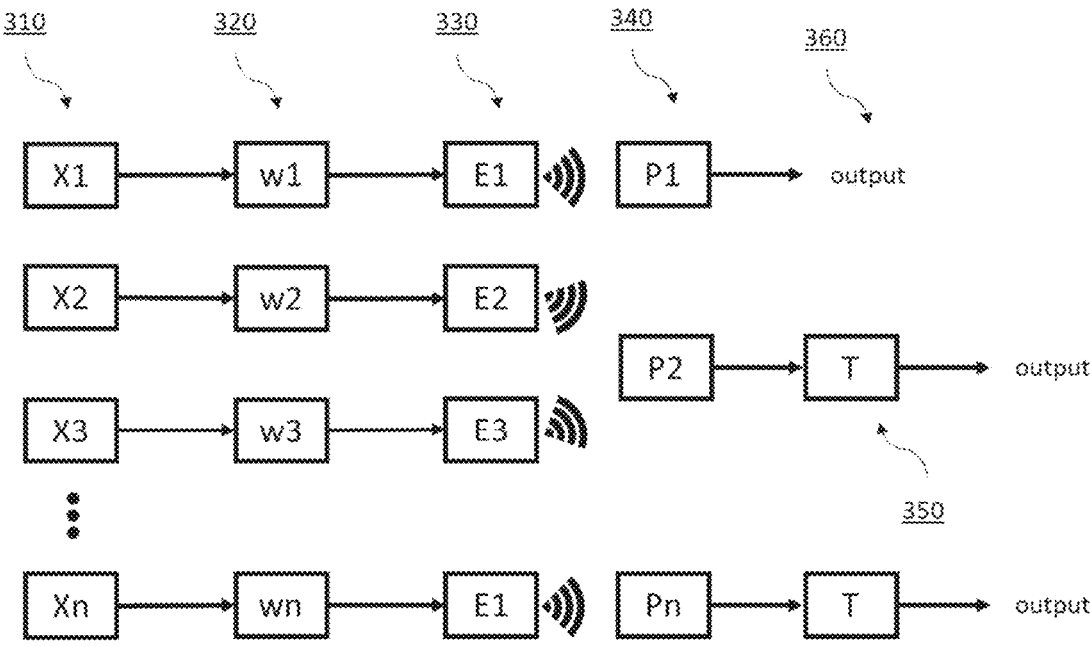
FIG. 3 shows schematic examples of artificial neurons according to embodiments disclosed herein.

An example representation of a neural network according to the present disclosure is shown in FIG. 3. As described in further detail herein, in such an embodiment a plurality of inputs are used by a plurality of artificial neurons to generate output values using one or more light-emitting devices ("emissive devices" or "emitters"), such as OLEDs, and photodetectors such as thin film photodetectors, where the output of the emissive devices is determined at least in part by the initial input(s) to each neuron, and the output of the neuron is determined at least in part by the output of one or more of the emissive devices.

The example neural network shows multiple neurons. Each neuron includes one or more input signals or circuits 310. Each provides an input to an emissive device 330 that emits light based at least partially upon the input signal. The input may be a "spike," i.e., a sudden rise and fall in an electrical signal, such as may be used to represent a binary "1" or similar data for s short period of time. One or more photodetectors 340 receives the emitted light and generates an output signal 360 based at least in part on the presence and/or intensity of the emitted light. Similarly, an output of a threshold device as disclosed herein also may be in the form of a spike or other electrical representation of a logical/binary 1 or 0, or other similar signal.

Each input may have a weighting factor 320 applied to it. For example, referring to the first example neuron shown, the input X1 may have a weighting factor w1 applied by a weighting circuit or other component that modifies the input before or as it is received by the neuron. The weighted input then may be provided to the emitter E1, based upon which it emits light that is detected by a photodetector P1. Each light-emitting device in a neuron as disclosed herein may be, for example, an OLED, a micro-LED, an LED, a quantum dot device, or any other suitable light-emitting device. In some cases, it may be desirable for the light-emitting devices to be fabricable using the same techniques used to fabricate other components of the neurons, such as photodetectors, TFT structures, and the like.

A neuron as disclosed herein may include multiple inputs and/or light-emitting devices. For example, the neuron 302 includes two inputs X2, X3 to the emitters E2, E3, one or both of which may have the same or separate weighting factors w2, w3 applied. The photodetector P2 may detect light emitted by one or both of the emitters, depending upon whether each input causes each device to emit light. Similarly, a neuron may include one or more photodetectors, regardless of how many light-emitting devices are present in the neuron. For example, the neuron 301 may include one or more photodetectors in addition to the photodetector P1 shown, each of which may detect light from the light-emitting device E1.

A neuron as disclosed herein may include a threshold device 350 that provides an output signal depending upon whether the output of the photodetector(s) in the neuron are at or above a threshold. For example, if the output of the photodetector P2 in the example neuron 302 is above a set threshold, the threshold device 350 may output a binary signal "1", or "0" if the photodetector output is below the threshold.

As described in further detail herein, each neuron may receive output from one or more other neurons as its input. For example, the neuron 301 may provide an output as previously disclosed, which is then transmitted to one or more other neurons 302, 309 as one or more inputs X2, X3, Xn. Similarly, the output of the neuron 302 may be provided to one or more other neurons 301, 309 as an input X1, Xn, and so on.

Flat panel display and similar architecture may be particularly suitable for implementation of neuromorphic computing devices as disclosed herein. Conventional flat panel displays include a large number of pixels, which are highly interconnected through data and gate lines and multiplexed in parallel through the system architecture. For example, in an OLED display, pixel luminance information is usually delivered by analog voltages sent down the data lines to a multi-TFT pixel driving circuit which in turn produces a drive current that produces an analog photon output from each OLED.

Similarly, in embodiments disclosed herein, each neuron as previously described may be represented by, and implemented as, one or more "pixels" that are driven by many data lines, with each data line representing one input to the neuron. For example, referring to FIG. 3, the light-emitting devices E 330 in each neuron may be provided by one or more emissive structures that would correspond to individual pixels in a conventional display panel. As described in further detail herein, a neuron may include one to many pixels, including an entire row of pixels in the display panel architecture.

In embodiments disclosed herein, the weighting factors may be stored in a look-up table and each input may have a positive or negative weighting factor. For example, referring to the example neuron structures shown in FIG. 3, each weighting factor w may obtain weighting factors from a storage medium in or external to the neuron and/or the display. Each weighting factor w 320 also may include be implemented as a pair of positive and negative weighting factors. All the weighted inputs to each neuron produce a series of currents. This may be achieved, for example, through a conventional sub-pixel addressing circuit. The weighted inputs may be summed as they enter the light-emitting device or series of light emitting devices, so the light emitted by the device or devices is proportional to the sum of the weighted inputs. The light output from this device or these devices can then be converted back into an electrical signal by one or more photodetectors optically coupled to these light emitting devices. For example, referring again to FIG. 3, each emitter 330 may emit light in proportion to the weighted input or inputs received by the emitter. As another example, in a conventional OLED panel architecture, each data line may be coupled to an individual OLED and photodetector, and the output from all the photodetectors may be collected in a bus line to which the photodetector(s) 340 or the threshold device(s) provide an output signal. The weighting factors may be stored within the processing device, within each neuron, or external to the neurons and/or the device. For example, if the optical neuromorphic computer is built on a silicon wafer using an architecture similar to a microOLED display, then weighting factors for each neuron may be stored using conventional silicon memory elements built into the silicon wafer in each neuron. More generally, any suitable computer-readable medium or logic circuit may be used to store and provide the weighting factors, which may be integral with or external to the neurons or the processing device.

As previously described, one or more photodetectors may convert light output provided by the emitter(s) in each neuron into an output signal, which also may be processed by a threshold device that only provides a positive output signal if the output from the photodetector(s) is at or above a threshold. For example, an output signal from one or more photodetectors may be provided as a current that is converted to a voltage using a capacitor connected to the input gate of a threshold TFT in an inverter circuit. The TFT then provides an output if the input voltage exceeds a threshold voltage of the TFT.

A display panel-based architecture as disclosed herein may itself to large-scale parallel processing and the ability to have each neuron fan-out and fan-in to very high numbers of connected neurons. For example, a display having one million conventional "pixels" may be reconfigured as 1,000 neurons of 1,000 pixels each, where each neuron is connected to every other neuron in the array, thereby allowing for full "broadcast to all" capability within the neuromorphic computing device. In contrast to purely electronic neuromorphic computing devices, this architecture allows for extremely high fan-in and fan-out capabilities. Similarly, compared to purely optical photonic computing devices, this architecture allows electronic components to be used to implement the weighting factors, and the array architecture may use conventional or modified thin film processes and devices that are known and understood in the art.

A neuron in a neuromorphic computing device typically is modeled as providing several features: weighting, fan-in, summation of weighted inputs, non-linear operation (thresholding), and cascadable output generation. According to embodiments disclosed herein, each of these features may be provided by a multiplexed flat panel display architecture. For example, each individual neuron may include a series of pairs of sub-pixel circuits, each of which is driven by its own data line and data driver. The data driver may be integral with the pixel array, or external to the array and connected through either a multiplexer or other high-density connection mechanism. As previously disclosed, each neuron input may be associated with a pair of electrical inputs, with one representing an excitatory (or positive) weighting input and the other an inhibitory (or negative) weighting input.

In an embodiment, weighting of one or more inputs may be implemented by storing one or more weighting factors in a lookup table or other computer-readable medium, with a weighting value for each sub-pixel. The weighting factors may be updated during processing tasks performed by the processing device as disclosed herein, for example during machine learning tasks that regularly or recursively update the weighting factors based upon prior processing steps or increments. The analog drive voltage from each data driver may therefore represent a specific current for an individual light-emitting device (such as in a conventional OLED display), which then represents the product of the output of the last neuron to be activated (1 or 0) multiplied by the weighting factor for the neuron input.

In a computing device as disclosed herein, fan-in may be accomplished by the data lines using the same multiplexing format as used in a conventional display panel, with a similar sub-pixel drive circuit. For example, as previously disclosed a 1,000×1,000 pixel display panel (1,000,000 pixels total), may provide 1,000 neurons, each neuron having 2 inputs or sub-pixels (one positive and one negative) for each of its 1,000 inputs, and each neuron occupying one scan line of the conventional display panel architecture. This structure provides a 1,000 neuron circuit with complete broadcast to all capability as previously disclosed, where every neuron is connected to every other neuron. Other interconnection schemes may be used, as described in further detail here. There may be a trade-off in the number of neurons that can be accommodated within a given emitter array versus the fan-in and fan-out capabilities of the array. For example, in an array with X rows and Y pairs of data lines, each neuron input contains 2 sub-pixel driving circuits to provide a negative and positive output to the respective excitatory and inhibitory photodetectors as previously disclosed. For a square arrangement (X=Y) where each row represents 1 neuron, the array contains X neurons that each broadcast an output to every other neuron and each neuron will have a weighted input from every other neuron to provide true and complete broadcast to all capability as previously disclosed. However, as described in further detail herein, for configurations in which a reduced level of fan-in is acceptable, more neurons can be incorporated on to each scan line. Broadcast Loops (BLs), then may be implemented as disclosed in further detail herein, where each neuron on a scan line is incorporated into a BL, but there may be less than 1 BL for each neuron on a scan line.

Figure 4A:
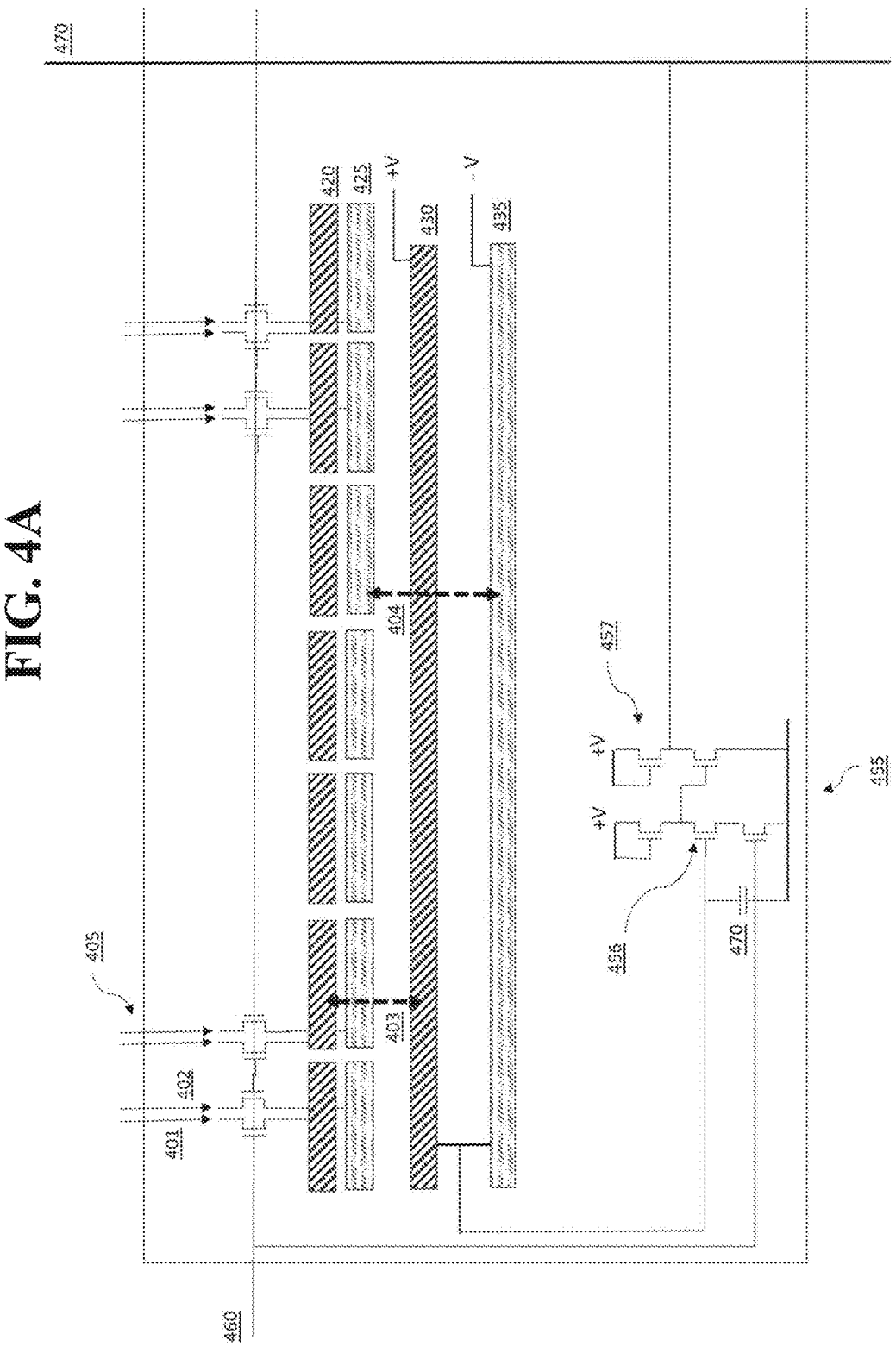
FIG. 4A shows a neuromorphic computing device architecture according to embodiments disclosed herein.

An example layout for a neuron as disclosed herein, which may include multiple excitatory emitters and multiple inhibitory emitters is shown in FIG. 4A. Any suitable TFT technology may be used in the array. Because weighting factors may be adjusted on a regular basis such as during learning phases of artificial intelligence computing tasks, the neuron array should self-compensate for TFT threshold voltage shifts, so amorphous silicon, oxide TFTs, organic TFTs, LTPS, or carbon nanotube devices could be considered for the backplane technology. The device may include one or more scan lines 460 and one or more output data lines 470. For example, one output data line may be provided for each neuron column, as disclosed herein. The light-emitting devices 410 such as OLEDs may be configured such that they only activate and emit light when the scan line 460 is being addressed. Such a configuration may be implemented, for example, by connecting the OLEDs 410 to the power rail through a TFT having a gate connected to the scan line that addresses the row of devices 410. Driver chip output or other input signals 405 as disclosed elsewhere herein may be provided to sub-pixel pairs or neuron inputs, such as for pairs of excitatory and inhibitory devices as previously disclosed. For example, excitatory devices 420 and inhibitory devices 425 may receive pairs of inputs 405 that include an excitatory input 401 and an inhibitory input 402, each input going to a corresponding device 420, 425, respectively. As previously described, a neuron as disclosed herein may include a single pair light-emitting devices in place of the multiple devices 420, 425, each of which may receive all of the relevant inputs 405 (excitatory or inhibitory). As previously described, the light emitted by the devices 420, 425 may be received by one or more corresponding excitatory photodetectors 430 and inhibitory photodetectors 435, respectively, which are optically coupled 403, 404 to the respective light-emitting devices. In some configurations, the light-emitting devices and the photodetectors may be segmented so as to avoid resistance losses that may occur in long, thin devices. For example, the photodetector outputs may be coupled to a common conductor that is then connected to the output data lines.

In an embodiment, the summing of weighted inputs may be accomplished by having all the excitatory currents 401 (weighted inputs) as previously disclosed connected to one or a series of light-emitting devices such as individual OLEDs 420, with the light output from these devices captured by one or a series of photodetectors 430 as previously disclosed. The photodetector(s) may be integral with the array, or may be arranged on a different plane, for example on a cover glass or lid. A bus line may be provided in each neuron to collect the output currents from multiple photodetectors. The same approach may be used to sum all the inhibitory inputs. Thus, each neuron in the computing device may sum all the positive and negative weightings for each input: one emitter and photodetector pair for positive weightings and the same for negative weighting. In this arrangement, an output current may be generated that represents the analog sum of all the weighted inputs, both positive and negative. This current may be converted into a voltage through a capacitor 470 as previously disclosed, and the resulting output voltage then may be provided to a threshold device 455 such as the gate of a TFT as part of an inverter chain. If the voltage exceeds a certain value, the inverter will trigger or threshold, and an output voltage will be transmitted to the output data line. In some configurations, another inverter may be used to ensure that an output trigger represents a high voltage instead of a low voltage. Alternatively or in addition, the scan line may be connected to another TFT in the inverter chain to ensure that each neuron can only trigger when it is being addressed. The voltage at the threshold device gate 456 may be reset prior to each scan line being addressed, using a TFT connected to ground and whose gate is activated by the previous scan line (n−1). As another example, the threshold device could also be a dual-gate TFT so the threshold voltage can be electrically adjusted. The threshold device may include a second inverter 457 so that the output trigger is voltage high.

A high-resolution neuron micro-array also may be made on single crystal wafer silicon. In this case all the control, drive and neuron circuitry may be incorporated into the silicon chip. Only monochrome light may be required for processing configurations, so no layer patterning is required at the pixel level during fabrication of the emissive devices. Furthermore, relatively very high resolution circuits may be used. For example, at 5 μm×5 μm for each pair of sub-pixels, a 1,000×1,000 array as previously disclosed may occupy only an area of 5 mm×5 mm. Such an array operating at 1 kHz, may provide computational capacity of $4\times10^9$ MACs/cm²/s (multiply and accumulate operations per area per unit time).

Embodiments disclosed herein may use any suitable thin film photodetector technology, organic or inorganic, as long as the photodetector spectral sensitivity as least partially matches the light-emitting device output to the tolerance required to generate the desired output values for the corresponding emitted light intensity. As previously disclosed, photodetectors may be placed on the array lid and aligned with the light-emitting devices, or else integrated on to the emitter array itself and placed under or over the emitters in a different plane. Waveguides also may be used to couple light from the emitters to one or more photodetectors if they are both placed in a similar plane.

A system architecture of a computing device as disclosed herein and as shown in FIG. 4A may include several components: the array itself and the electronics/drive/control circuitry external to the actual array, either integrated onto the array substrate or external to this substrate.

This array itself may include a series of scan and data lines. The scan lines may be driven by a shift register that is either integral with the panel or external. The data line pairs that provide each neuron input may be driven by conventional analog data drivers, such as those used in an OLED display panel or the like. Each neuron also may have an output data line as previously disclosed, which can be common to each column of neurons in the array. As previously disclosed, the output data lines may be connected to a threshold device and/or a sensor chip or similar component to detect their voltage and hence the output state of each neuron as the array is multiplexed in sequence using the shift register and scan lines.

For configurations in which a lower degree of fan-in is acceptable, Broadcast Loops (BLs) may be used as previously indicated. Each neuron on a scan line may be incorporated into a BL, but there may be less than 1 BL for each neuron on a scan line. For several neurons per scan line (e.g., 10 per line), then each column of neurons may become a Broadcast Loop in which neurons near the data driver act as edge or interface neurons and may be connected to similar neurons in the next or previous Loop. Neurons or pixels near the data line edge (driver chip) may be edge or interface neurons that connect to two different broadcast loops.

If more than one neuron is implemented per scan line, then it may be relatively difficult for the array to provide true "broadcast to all" functionality. For example, in an arrangement having 10 neurons per scan line in a 1,000,000 pixel array (100 pixels per neuron), there are 10,000 neurons with 10 BLs and 1,000 neurons in each BL. Each neuron would then have 100 input pairs (positive/negative) and would be part of a BL with 999 other neurons. Thus, it may be necessary to select which neurons connect to any given neuron.

Different patterns or methodologies may be used. For example, a relatively small number (e.g., 50) neighboring neurons in each direction may be selected as the (100) input pairs. As another example, a sampling approach could be applied to connect 10 nearest neurons, every second neuron for the next 20, every third for the next 30, every fourth for next 40 and every fifth for next 50, in each direction, to provide the desired number of inputs (e.g., 100 continuing the prior example). This protocol may be stored, for example, in the system controller. In this case each neuron may have connections out to +/− 150 neurons each side of itself, while only having 100 total connections. Interface neurons or edge neurons may connect to a number of neuron outputs from neighboring BLs, with a corresponding reduction in the number of interconnects to their own BL.

Figure 5:
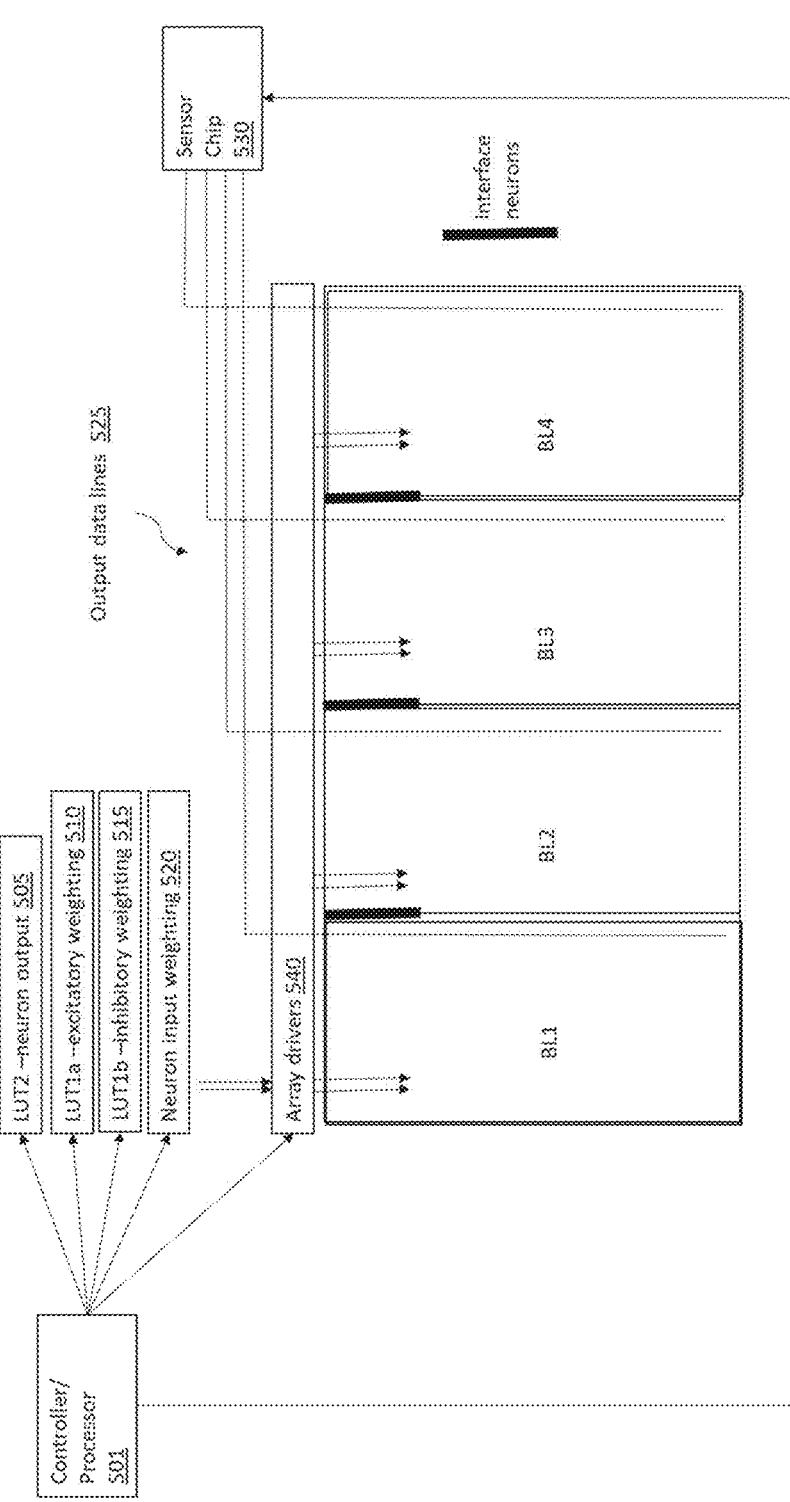
FIG. 5 shows a neuromorphic computing device architecture according to embodiments disclosed herein.

An example schematic view of an architecture including four Broadcast Loops is shown in FIG. 5. As with other embodiments disclosed herein, various lookup tables or other structures may be used to store various data. For example, lookup tables 505, 510, 515, 520 may store the output of each neuron, excitatory weighting values for each neuron, inhibitory weighting values for each neuron, and/or the neuron input weighting values, i.e., the voltage(s) associated with the required current(s), respectively. One or more array drivers 540 may provide the input values as electrical signals to the Broadcast Loops and/or interface neurons as previously disclosed. Output data lines 525 from each broadcast loop may be read by a sensor chip 530 or other device. A controller or other processor 501 may control operation of and access to the lookup tables 505-520, operation of the sensor chip 530, and operation of the array driver(s) 540.

As previously disclosed, a sensor chip or other device may be used to sense the output (high or low) of each neuron output data line, as multiplexed by the scan lines. Look up tables or similar structures may be be used to store the output status of each neuron in the array, the positive weighting factor for each neuron input, and/or the negative weighting factor for each neuron input. A controller may calculate the weighting factors for each neuron input in real time based on the product of the previous neuron output (1 or 0) and the neuron input weighting factor, such as the weighting factors 320 shown in FIG. 3. This calculation is equivalent to the input video signal in a conventional display, and the resulting output may be provided to the array data drivers to produce an output voltage associated with the analog current in each photodetector that corresponds to the input weighting factor based on the light measured from the light-emitting device.

As previously described, panel and imaging architectures may be particularly suited to implement the hybrid optical/electrical computing devices disclosed herein. Accordingly, embodiments disclosed herein may provide for multi-function devices that can serve alternatively or simultaneously as a display panel, an imaging sensor, and a computing device. For example, a single array of neurons as disclosed herein may serve as both a two-dimensional imaging device and as an artificial intelligence or other computer processor. As another example, embodiments disclosed herein may provide concurrent imaging, processing, and display capabilities, such as for AR uses. In such an application, a single device may obtain image data, for example by using the photodetectors to obtain RGB or monochrome image data from the environment. The device then may switch modes or use other pixels formed into neurons in the device to process the image data for AR purposes. Finally, the device may switch modes again and/or use other pixels in the device to provide a modified display of the image data, such as to insert, remove, or modify components of the environment captured during the imaging process. The device may be implemented as any suitable display architecture, such as an active matrix OLED (AMOLED) or similar device. When a device as disclosed herein is configured to be a multi-purpose device, various portions of the device may be reserved for use in specific functions. For example, a portion of a display active area may be reserved for use only as artificial neurons, only for use as a display, or only for use as an imaging device. One technique to do so is to have lines or regions of pixels that are constructed or used only to serve a single purpose, such as alternating lines of neurons, imaging pixels, and display pixels. Alternatively, portions of the device active area (i.e., the area used for imaging, display, and/or processing) may be reserved for a specific use at a set period of time. Alternatively or in addition, each pixel area may have a portion reserved for use as an imaging pixel, a display pixel, or a neuron.

Various architectures and techniques may be used to achieve a multi-function device in a single array of neurons as previously disclosed. For example, a separate photode-tector and series-select TFT may be placed in each pixel of the array, using the same processes used to fabricate the neuromorphic computing array. Additional data lines may be added to each column of pixels to allow the imaging array photodetector currents to be recorded by a sensing chip external to the array, either placed on the same substrate or external to the imaging substrate and accessed through external electrical connections.

Figure 4B:
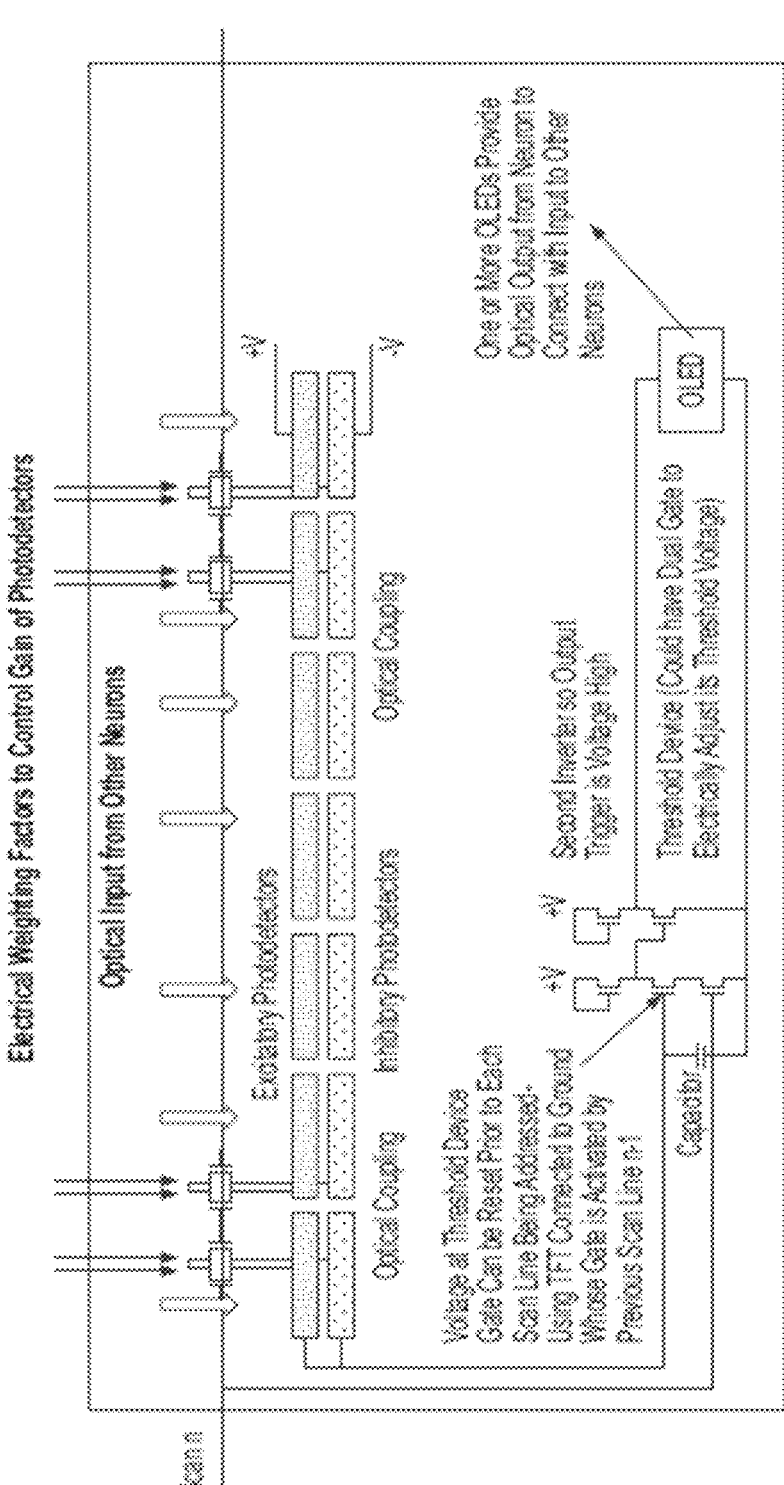
FIG. 4B. shows a neuromorphic computing device architecture according to embodiments disclosed herein, with particular emphasis on optical component features.

More generally, a neuron as disclosed may include mul-tiple inputs and/or light-emitting devices, and each neuron may receive output from one or more other neurons as its input. This input may be optical, electrical, or a combination thereof, and the output signal from each neuron can also be optical, electrical, or a combination thereof. Broadly speak-ing, multiple OLEDs may be used to transmit light from one neuron to multiple neurons to signal whether or not the output of that neuron was above threshold (so 1 or 0 output). This light may be directly coupled from one neuron to a neighbor (for example a neuron stacked on top of another neuron) or waveguided in a dielectric connecting an output OLED from one neuron to an input photodetector of another, or to multiple other neurons. FIG. 4B shows a similar example device, with particular emphasis on features related to optical interconnects.

FIG. 4B shows that, as previously disclosed with respect to FIGS. 3 and 4A, one neuron may receive many optical inputs from other neurons. These may be detected by photodetectors or phototransistors whose optical gain can be controlled by an electrical signal, representing a weighting factor. Each optical input therefore may have its own detec-tor and weighting factor. Weighting factors can be excitatory or inhibitory by which set of photodetectors are energized to process the input light. The photodetectors will therefore sum the weighted optical inputs and produce an electrical output which could be applied to a threshold device, whose output can drive one or more OLEDs to pass optical con-nectivity to subsequent neurons, and therefore become their optical input signals.

In addition, multiple OLEDs may be used that have different output spectra. In such an embodiment, various arrays or other combinations of photodetectors in the arti-ficial neurons may be made to detect only specific wavelengths or the light from specific OLEDs, for example by use of color filters applied to the photodetectors or the use of different spectral sensitivity materials in different photode-tectors. Having neurons process different wavelength of light in parallel increases the processing power of the network.

The light output of a neuron also may be optically routed to other neurons by vertical stacking and/or by (horizontal) dielectric waveguides. 3D-microoptical components may be used to manipulate light beams at submicron scales to better define spatial channels, and horizontal waveguides can be patterned to route light only along certain paths.

In embodiments that use optical interconnects, multiple logical channels may be defined within the same spatial channel by using multiple wavelengths and polarizations. This may be a significant advantage of optical connections for embodiments disclosed herein, especially in comparison to conventional devices that do not combine a processing device with a display and/or imaging device. These may be obtained by filtering light after emission and before detec-tion, as well as by using emitters and detectors of different spectral profiles, for example by using distinct materials or different device geometries (e.g. cavity effects, material thicknesses, etc.). Wavelength and polarization filtering may be achieved with chemical (e.g. thin-film molecular filters) or physical (e.g. nanophotonic or plasmonic structures) means. Multiple of the above methods can be combined to further diversify the available spectral responses, and hence the number of logical channels.

Artificial neurons as disclosed herein include a weighting-summing-nonlinear transformation architecture. When add-ing optical connections, this has several implications:

Weighting results from anything that can modify the effective link between neurons, and so adjusts the magnitude of the inputs before or after they are summed or integrated and enter the non-linear thresholding device. This weighting may be implemented optically, electrically or a combination thereof, as disclosed herein. This can happen at the input to a neuron, at the output of a neuron after thresholding, or anywhere in the channel in-between. These can be imple-mented in a tunable manner for a reconfigurable neuromor-phic processor, or in a fully or partially fixed manner if all or some of the weights are unchanging (limiting plasticity);

Optical elements may be used to change the amount of light impinging on a photodetector or emitted from a light-emitting component, either at the logical (e.g. wavelength) and/or spatial channel level, for example: by using microl-enses, liquid crystals, electrochromic elements; Detector responsivities can be adjusted, for example by changing detector bias, changing gate voltage of a phototransistor;

The detected current can be amplified or current-divided, for example by using a thin-film amplifier or transimpedance amplifier;

The recovered current can be further processed locally, for example via analog electronics, local digital look-up tables, or the like.

The electrical signal (2-4) is what is broadcasted to other neurons after nonlinear transformation and possibly optical conversion. Weighting "after" the output also may be done at this level as well if the transformation can be accounted for, even though it technically happens before it.

Excitatory and inhibitory synapses may be defined at any of the above levels. (1) dedicated optical channels can be used. (2) Within the same optical channel, spectrally-similar detectors with different responsivity magnitudes may be used to produce a net current with a certain polarity akin to balanced photodetectors (except with the same amount of light impinging on both detectors, differentiation may take place at the responsivity level). (3) Identical detectors may sum their currents after experimenting different amplification. (3-4) A single photodetector may be used in conjunction with an electrical switch to control whether the current adds or subtracts with those of other synapses. (4) The sign of the weight can be defined in a local analog or digital processing unit.

Summing or other integration may be performed either in the optical or electrical domain depending on the weighting scheme. If (1) optical weighting is used, then a single photodiode effectively may sum a portion or all of the weighted signals. If (2-3) is used, all the resulting synaptic currents can be summed by wiring the weighted outputs together. Switches can be used at this level to direct currents from individual detectors to positive and negative lines which are then subtracted before thresholding. (4) This can also be done locally with dedicated active electronics such as summing amplifiers or adders.

A bias is a fixed input to a neuron. It may be achieved optically (fixed light input) or electrically (fixed current or voltage input) at any of the above levels. Anything that yields nonlinear input-output after the summing of the signals may form the nonlinear transformation. This also may be analog or local digital.

Referring to the physical form of the input information at each artificial neuron, the input layer of neurons receives signals from outside instead of or in addition to other neurons. As used herein, an "input neuron" refers to those neurons which also receive inputs from a source that is not a bias or other neurons. Anything that can be converted to an electrical or optical signal compatible with the input or next layer of neurons may be used.

Specialized sensors can therefore be added to some or all of the neurons as inputs. These can be from different devices (e.g. electronic sensor feeding electronic data), or can be co-integrated if made out of the same materials as the display. The latter is a feature of thin-film optically-connected neurons. For instance, photodiodes of the same type as the in optically-connected neurons can take in visual information—can be thin film organic or inorganic. Organic upconverters can take non-visual near-infrared light and output visible light for neural processing Organic spectrometers may be used to convert chemical information to localized optical signals.

As explained in further detail below, being able to store values for artificial neuron elements (nonlinear units, weights, short-term memory, long-term memory, gain circuits) may be particularly useful for reconfigurable networks. Beyond local RAM, this memory can be co-integrated at the physical level at any of the levels described above. For instance, an active-matrix architecture allows analog voltages values to be stored on capacitor plates. This can be used to set the responsivity of a phototransistor or the transmission of a liquid crystal filter. Analog values can also be stored in the fraction of coexisting phases of matter whose optical and electrical properties vary continuously based on the fraction.

There are several reconfigurable elements in each neuron; for example, nonlinear units, weights, short-term memory, long-term memory, and gain circuits. Each reconfigurable unit may be changed either in real time or during an offline training session. They may be reconfigured either via local learning rules, global learning rules, or via external inputs. In order to practically perform this reconfiguration, there may be a need for a mechanism to transmit information either in electronic form or optical form to each reconfigurable element in each neuron. To be reconfigurable, each neuron also may contain an electronic or photonic memory circuit and an electronic biasing circuit, composed of e.g. RAMs coupled to LUTs, much like in the hardware typified by in-memory computing. Reconfiguration information may be stored and transmitted in digital form to other neurons or to the outside world. To simplify the memory circuits, the neurons may be limited to volatile memory units that are loaded upon boot time from an external non-volatile memory unit.

In this scheme, an array of artificial neurons organized in a 2D substrate (or in "2.5D" if in a stacked configuration) may be used, each with their corresponding memory units. However, it is understood that artificial neural networks typically need a level of plasticity (i.e. change of internal neural states or synaptic weights) in order to function properly. The plasticity rate, i.e. the rate of change in the configuration of each neuron, is often much slower than the data processing rate performed by the neural network. Three kinds of plasticity rules may be identified: local, nearest-neighbor, and global. They offer different neural-network functionalities at different speeds.

In the local plasticity rule, the circuits in the neuron will reconfigure, or "update", themselves based on the real-time data it receives as input or sends as output to other neurons. This update rule is implemented by an electronic circuit present in each neuron, which may be fixed by fabrication or field-programmable, like FPGAs. This plasticity rule typically will operate as fast as possible, in some cases as fast as the data rate. An example of such a rule is STDP, which allows the network to have unsupervised learning capabilities.

The nearest-neighbor plasticity rule is a generalization of the local plasticity rule. Here, the update rule affects not only the neuron itself, but also the neighboring neurons. This strategy may be limited to neighboring neurons because this strategy is conducive to direct wired connections between said neurons. This enables a "small-world network" topology that mimics many networks studied in both engineering and neuroscience. It has been shown that systems with small-world connections display enhanced signal-propagation speed, computational power, and synchronizability. These are all desired features of a distributed reconfigurable network. This plasticity rule does not need to operate as fast as the local one. An example of this rule could be to rewire a cluster of neurons to produce the same overall outputs in the event that one of them becomes malfunctioning.

The global plasticity rule generalizes the nearest-neighbor rules. Here, the update rule is based on the inputs and outputs of a subset of neurons in the neural network, and has the reach to affect every neuron in the network. Because it is global and general, it is also the slowest. An example of this rule in action is supervised learning, wherein the weights of hidden layers of neural networks are changed based on whether the output layer is close or not to a predetermined target.

These three plasticity rules may allow the network to learn behavior based on inputs and programmed rules. The reconfiguration speed, in general, goes inversely proportional to how global it is: the local is the fastest and the global is the slowest. It is likely that the update rule procedure will render the output of the affected neurons unusable while it is running Therefore, it may be desirable to implement a mechanism to transmit and execute these rules in a timely manner.

There are two possible addressing schemes to implement these reconfiguration methods with the lowest latency possible: random access or sequential access.

The random access term is borrowed from "random access memory" (RAM), in which data is manipulated within the same amount of time irrespective of its physical location in hardware. Similarly, a random access connectivity pattern allows one to send a reconfiguration signal to any neuron in the 2D or 2.5D substrate within a deterministic amount of time. This can be implemented with well-known protocols such as Address-Event Representation (AER), used extensively in the TrueNorth chip. The AER is itself a simplified version of the networking protocol in the world wide web, where messages are encapsulated in packets and redirected within a network via dedicated "router" circuits. This allows low-latency messages to be transmitted from one neuron to another in the network, or from the outside world to one neuron, but it imposes significant overhead because of the encapsulation and routing. Therefore, it is fast if the rate of messages transmitted in the network is small and sparse. Otherwise, there can be congestion points in each router. This communication scheme is well-suited for small world networks, where most communication happens between neighboring neurons, and very rarely a message needs to be transmitted to the edges of the network.

The sequential access is an alternative to random access that offers better performance in the case where all neurons need reconfiguration at a single step. With the prior knowledge that all neurons need updating with as high refresh rate as possible, then a more appropriate addressing scheme is to not use any routing at all, which avoids encapsulation and header overhead. Instead, we can package all the data in a sequence of bits to be streamed to the neural network in bulk, and use serialization and deserialization circuits to unpack the stream and update one fraction of the neurons in a single step. As an example, this can be implemented like the scanline driving scheme commonly employed in flat panel displays, where a scan line selects a row to be updated, and data lines feed the required data in parallel to an entire row of neurons. A full neural network refresh can be performed by sequencing the updates row by row until the entire network has been reconfigured, much like a full frame refresh in a flat panel display.

The main performance metric here is reconfiguration latency vs. reconfiguration throughput. The random access addressing scheme provides low latency reconfiguration for low throughput update rules, but can become congested or fail at high throughput. The sequential access scheme has a high, but fixed, reconfiguration latency independent of throughput. Either of these schemes are sufficient to enable full-scale reconfigurability of the neural network. They can be used in isolation, or together, depending on the needs for the application.

The neurons in the network may be subdivided into two non-disjoint categories based on their input-output capability. They can take signal inputs from the world via optical or electronic sensors and detectors. They can also output signals to the world via light emitters, direct wires, or radio antennas.

Evidence from both neuroscience and machine learning fields suggests that useful networks have an "input" layer, which is dedicated to taking inputs from the world, followed by hidden layers, which does not have access to the world and cannot be probed directly, finally connected to an "output" layer, which displays the results of the computation or cognition to the world. Based on that, three methods may be used for slicing the neural network into input and output layers. For simplicity, they may be referred to as I/O neurons, and the strategy can be applied to either input or output.

I/O neurons can be organized at the perimeter of the network, forming a one-dimensional I/O. This is amenable to signals that are a one-dimensional time series, or a scalar time series that was deserialized for this purpose. An example of a one-dimensional time series is data coming from a set of sensors in parallel. An example of a scalar time series is an audio stream.

Another possible organization is to have a 2D array of neurons in the network be potentially I/O. This can be a subset of the entire neural network or its entirety. In this scheme, the neural network will be able to process 2D data arrays, e.g. images or video frames. It can also process a one-dimensional time series that was deserialized, allowing for finite impulse response filters or Fourier and other transforms to be performed in real-time.

Another possibility is to abandon the one-to-one neuromorphic mapping between the hardware neurons and the artificial neurons. In this case, we segment a much larger artificial neural network into smaller chunks that fit the network implemented in hardware. At each processing step, each neuron is reconfigured to implement the chunk. Then, inputs are fed electronically or optically to the network and outputs are collected after the required processing time. The collected output is stored in memory either within the network (fast), or in a central processor outside (slow). The outputs are recorded because they may become inputs in subsequent steps. The process is repeated until all of the artificial network has been emulated. The final output is then displayed to the outside world via the central processor coordinating this operation. This scheme would have a high latency in comparison with the others, as it requires breaking up a neural network into chunks, and reconfiguring the entire network for each processing step. But it offers the most flexibility in what kinds of network it can simulate.

In some embodiments, the functionality of the array between imaging, display, and/or processing may be alternated using alternate frame times. For example, the device may scan through the entire array as an imaging device by accessing output signals from each photodetector without operating the light-emitting devices within each neuron, and then repeat the process with the array as a processor as previously disclosed. As another example, a second set of scan lines may be used such that the array can be simultaneously multiplexed as both an imager and a processor. In this arrangement, scan driver for each function may be placed on either side of the array. Each pixel then both acts as an imaging circuit (TFT in series with a photodetector) and as part of a neuromorphic computing array as previously disclosed herein.

Figures 6, 7, 8:
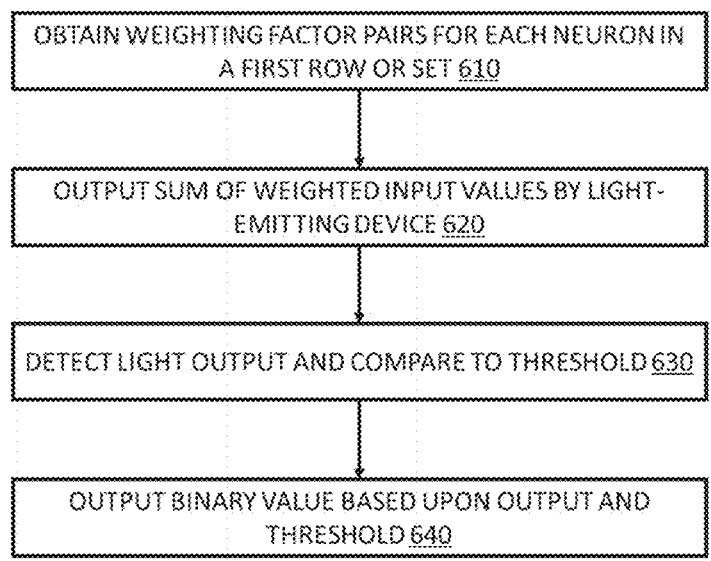
FIG. 6 shows an example process for operating a hybrid neuromorphic computer according to embodiments disclosed herein.
FIG. 7 shows a schematic representation of a conventional display architecture.
FIG. 8 shows an architecture corresponding to that of FIG. 7A for embodiments disclosed herein.

A computing device as disclosed herein generally may be operated in any manner appropriate for a neuromorphic computing device or neural network, while using the optical components disclosed herein. An example process of operating a device as disclosed herein is shown in FIG. 6. At 610, weighting factors and initial inputs may be obtained for a first row or other group of neurons. The neurons may output a weighted sum of the inputs at 620, based upon the weighting factors by emitting light from a light-emitting device within the neuron as previously disclosed. At 630 one or more photodetectors may be used to detect the intensity of light emitted by the light-emitting device or devices within each neuron and, at 640, the detected light may be used to generate an output value. For example, a signal from a photodetector may be compared to a threshold level to produce an output of 1 or 0 depending upon whether the light is above the threshold or not.

More specifically, a computation process according to embodiments disclosed herein may iterate through each row n of neurons within an array as previously described. Driver chips within the array may provide weighting factor pairs for each input node. The data driver output may be synchronized to each row, such as via a scan driver shift register or other construct. The driver chip output for each neuron in the row may be calculated as a first stored lookup table value (LUT1), multiplied by a logical value indicating whether a previous neuron provided an output or not. This logical value also may be stored in a lookup table LUT2 as previously disclosed. A light-emitting device such as an OLED then may provide a light input equal to the sum of all weighted inputs received by the neuron. A threshold device such as a comparison circuit then may provide a logical output value of 0 or 1 to the output line of the neuron. The output data lines may be read by a sensor chip as previously disclosed, with the logical values stored in LUT2.

In an embodiment, one or more pairs of lookup tables may be used to store weighting factors for each neuron. For example, positive and negative values may be stored for each neuron in lookup tables for that neuron. The weight factors for each neuron may be stored in a common lookup table across the device, or each neuron may have an individual lookup table. After the output data line is read by an external sensor, it may be reset before the scan driver moves to the next n+1 scan line in the array. The weighting factors may be adjusted by a system controller in accordance with neural network learning techniques known in the art. In other embodiments these weighting factors can be stored in circuitry in each pixel as previously disclosed.

Compared to prior approaches to artificial neuron arrays, embodiments disclosed herein may not require advanced optics, filters and/or lasers to be developed and integrated onto expensive substrates. Embodiments disclosed herein also may use established manufacturing processes and available components. Accordingly, embodiments disclosed herein may provide significant improvement in manufacturability, use, and cost over conventional techniques.

For example, there is currently increased interest in interpreting real-time video information derived from cameras and other sensors with very little latency between the video capture and actions based on that information. This is useful in numerous applications such as autonomous vehicles, facial recognition and procedures based on fine motor skills—virtual or remote surgery, video games, and the remote playing of a musical instrument etc.

Current approaches typically use a camera, often in combination with a common data compression technique such as H.264, which sends compressed data to a processor for interpretation and subsequent action. This process requires relatively high bandwidths and power consumption, and may result in unacceptable latency for many modern applications. As another example, augmented reality (AR) glasses and similar applications put space, weight and power are at a premium, and also require low latency in image processing. AR applications may be of increasing interest, for example due to diseases such as COVID-19, flu strains, and the like, which can be rapidly spread by someone coming into close physical contact or proximity with infected people. A signature of infection is a fever with elevated body temperature. Use of AR glasses can enable a wearer both to detect people nearby with elevated body temperatures and display such information to the wearer/user.

In addition to those examples discussed above, embodiments disclosed herein also may provide for integrated AR devices based on thin film devices, including but not limited to OLEDs, to act as a camera and also provide neuromorphic processing to detect people close to the user, measure body temperature, display that and/or other information back to the user, or perform other image processing without requiring bulky components or high power consumption and data communication requirements, thereby enabling the fabrication of a wearable consumer AR device to perform these functions.

Specifically, embodiments disclosed herein provide integrated neuromorphic computing systems which include an OLED display integrated with a 2D sensor, such as a camera, and an integrated neuromorphic computer comprised of interconnected OLED-based photonic neurons as previously disclosed, in which the neuromorphic processor performs preprocessing of the video captured by the camera. The ability to integrate neuromorphic computing into a two-dimensional sensing array may allow for extremely low power, low latency systems even with wireless connectivity on account of greatly reduced data rates. In some embodiments, the same OLED devices that provide display functions also may provide the photonic neurons of the OLED-based neuromorphic computer. The approaches disclosed herein also may enable relatively low latency across the entire imaging and processing system from sensing to actuation.

Embodiments disclosed herein provide improved devices and techniques for interpreting virtual images captured by a camera and/or other sensing device. Using a neuromorphic processor integrated into a two-dimensional sensing array reduces system latency, and also power requirements as high data rates require fast processing chips which consume excessive power. For example, to provide facial recognition or an understanding of the image being captured, a conventional approach uses a compression technique to reduce the video data rate. For example, a high-definition (HD) image at 60 Hz at 10 bit resolution would produce 600 million bits per second, which far exceeds conventional wireless connectivity, and even with 80% compression still requires 120M bits per second. This image would then be sent to a processor to perform the image recognition. In the case of an AR/VR system the processor would need to be external to the headset or glasses on account of its power requirements.

In contrast, embodiments disclosed herein integrate the camera with a neuromorphic optical computer as previously disclosed herein, as well as in U.S. Patent Pub. No. 2019/0311256, the disclosure of which is incorporated by reference. The integrated device may be made using conventional thin film deposition processes and may include thin film transistors, light emitting devices and optical sensors integrated in a two-dimensional array to make a series of interconnected optical neurons and a two-dimensional imager. A range of thin film transistor technologies may be employed—such as polysilicon, amorphous silicon, carbon nanotube, oxide TFTs such as IGZO (Indium Gallium Zinc Oxide) or other alloys and organic based thin film transistors. Alternatively, a silicon backplane may be employed, with the light emitting and sending components deposited on this backplane. Such a device also may serve as a display providing video images which are used in AR and VR headsets, or other devices. Data from this device would be sent wirelessly to an external processor that could interpret the video images. Schematic examples of a conventional approach and an approach based on the present disclosure are shown in FIGS. 7 and 8, respectively.

The systems and techniques disclosed herein may significantly reduce the latency and bandwidth requirements from the conventional approach. This is because the neuromorphic processor can perform preprocessing of the visual image captured by the camera, in a similar manner to which the visual cortex in the eye preprocesses optical images before sending the visual data from the eye to the brain, thus reducing bandwidth requirements for the optic nerve. By performing object detection and feature extraction using deep learning techniques, focal plane processing extracts only the useful information, and without delay we can significantly reduce the data rate to be sent from our device (wirelessly) to an external processor for full image interpretation.

Reduced latency also may provide benefits in other technologies. For example, currently artificial intelligence (AI) is used between physical sensors and physical actuators, such as in a self-driving car that uses a camera to collect data and a processor which performs object identification, and then applies this interpretation to steering/speed control. Latency in such a system is a key issue which needs to be minimized.

As another example, latency can be a significant limiting factor in computer vision applications, which often require a deep artificial neural network to classify object in an image. Such processing requires relatively large amounts of power. In conventional systems, mobile devices often send raw images to a cloud-based processing system, making a mobile AR application using such systems unviable due to the high latency. In contrast, AR glasses powered by an AI display as disclosed herein may enable additional AI-based functionality by allowing for local preprocessing images reducing communication bandwidth, and therefore latency.

More generally, in augmented- and virtual-reality systems, embodiments disclosed herein may be used to interpret images while having relatively low power requirements, which enables wearable systems such as AR/VR glasses to perform unique functions further enhancing their performance. For example, by interpreting the camera image in an AR system, the device can choose what information is displayed by the display as an overlay to the reality seen through the glasses. OLEDs may be particularly well-suited for AR systems as typical AR image overlays only illuminate a small fraction of the display pixels at any given time, making them well-suited for emissive display systems and low power operation. By further interpreting the image and only showing relevant information in the context of what the camera is seeing, further power reductions may be made. Furthermore, in AR systems it is often desirable to display an overlay to reality to show information relevant to what the user is seeing. For example if the camera identifies people in the user's field of view, the system may perform facial recognition. On the other hand, if text in another language is detected, the system may generate and display a translation automatically. As another example, if a train or other transport is detected, the system may obtain or calculate and display schedules and other relevant information. Embodiments disclosed herein may greatly reduce power and bandwidth requirements for such a system, which typically will use an additional external processor.

Figure 9:
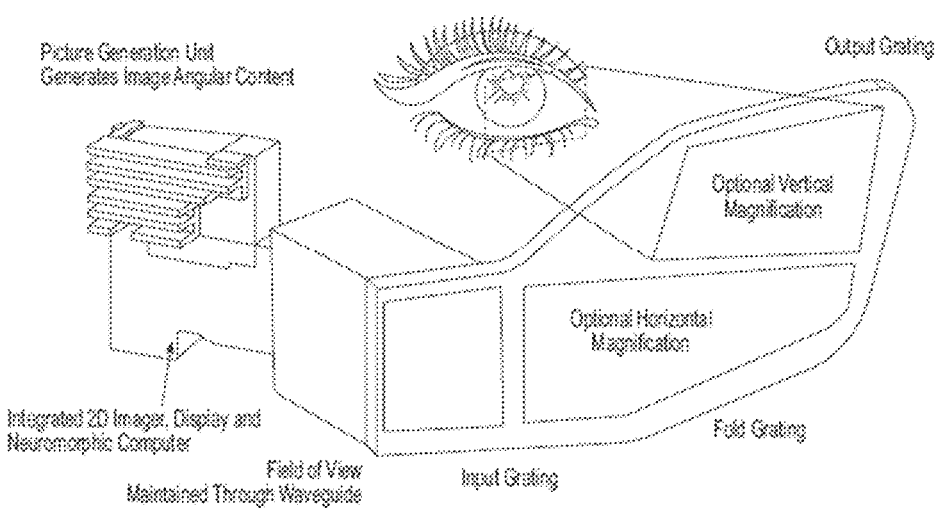
FIG. 9 shows an example of an augmented reality system including an integrated neuromorphic computing device, imaging device, and display according to embodiments disclosed herein.

As another example, conventional approaches to facial recognition typically rely on wireless tethering of an AR device to a nearby smartphone, which again is too bandwidth- and power-constrained to allow for near real-time facial recognition. Embodiments disclosed herein may reduce bandwidth requirements by up to 40×, thereby enabling Bluetooth connections to allow real-time processing. Generally in AR applications, the processor interprets images seen by the camera and information related to this interpretation is shown by the display with low latency. So in an AR system as disclosed herein, the display can show the user a real-time interpretation of the image the user is seeing. So for example, for facial recognition applications, an external processor may provide facial recognition based on the preprocessed information sent to it by an integrated device as disclosed herein. If that processor was also controlling the OLED display as part of the AR headset, it could attach and overlay name recognition to faces being viewed in the real world through AR glasses. An example of such a device is shown in FIG. 9.

As another example, AR headsets often may benefit from eye tracking. For example, referring to FIG. 9, embodiments disclosed herein may be used to track the position of the user's eye in addition to other processing tasks disclosed herein. In this use, the optical path can be reversed so that light from the eye can enter the waveguide and be viewed by the display and camera, which can determine the position of the user's eye.

As another example, applications that require real-time or near real-time control using fine motor skills also may benefit from reduced latency made possible by the present disclosure. For example, AR glasses used for surgery or medical procedures, or other applications in which technicians perform critical repairs under supervision or control of a remote third party, remote playing of musical instruments, or the like may benefit from the reduced latency made available by embodiments disclosed herein. Conventional control systems typically cannot achieve latencies less than about 100 ms, whereas such applications require or would significantly benefit from latencies of about 5 ms, which can be achieved using embodiments disclosed herein.

As another example, self-powered systems may be used in self-contained implantable devices or wearable devices. In such a device, small light-weight arrays primarily or entirely based on thin film components may be integrated on to flexible substrates based on thin film deposition, and may run at much lower clock speeds than conventional devices thus reducing power requirements. Examples of such thin film devices may include two-dimensional sensing arrays with integrated neuromorphic processors as disclosed herein, wireless charging components, integrated solar power components, and thin film batteries, and wireless communication components.

As another example, smart cameras that not only record images but interpret them before communicating this data to the outside world may benefit from the devices and techniques disclosed herein.

As another example, drones and unmanned aerial vehicles may benefit from disclosed embodiments by obtaining interpretation of camera images without needing high power and bandwidth required to send large amounts of data off the drone for processing, as well as reduced lag time for the drone to act on data obtained by the camera.

As another example, embodiments may provide for processing of multisensory data being recorded/captured by portable sensing arrays formed of the integrated devices disclosed herein. Particularly for VR applications or even conventional photography/videography, there is a trend to attempt to capture the full environment being recorded. For example, in addition to image and audio, scents (scentography), temperature, wind, and other data may be captured concurrently or simultaneously with video. This data needs to be processed so that it is correctly synchronized to the video and audio, for example so that the image, audio scents, wind, temperature gradient, and other data are all consistent as the operator's view is changed. Such synchronization typically requires large amounts of bandwidth and processing, and thus benefits from pre-processing techniques disclosed herein.

Generally, any transportation-related applications also may benefit from various embodiments. Automobile, airline, and/or space vehicles typically have weight, power and latency constraints, which are readily met by the integrated sensor/processor systems disclosed herein, which provide for high performance with low weight, power consumption, data rates and latency.

Embodiments disclosed herein, which make possible the use of neural processing at the level of a display, may enable rendering of images based on data other than externally-input raw pixel RGB intensities. For instance, the use of autoencoders is a popular neural image processing technique, in which a low-dimensional "code" vector is be fed to a trained neural network and output as a high-dimensional vector (image). Autoencoders are used for compression, denoising, and super-resolution imaging. A neural network integrated with a display as disclosed herein may act as the decoder in an autoencoder, thereby reducing the amount of data needed to be sent to the display to output a complete image. An active matrix of the display, in this case, may be used to modify the weights configuration of the network, such as by modifying the weights of summed or integrated inputs as previously disclosed herein. Such a configuration may allow different tasks (inputs-outputs) to be executed in the same device. Furthermore, display pixels with embedded sensors as disclosed herein may act as the some or all of an input layer of an autoencoder, sending their outputs to further layers to perform the coding before being fed back to the display. Such a configuration may be used to achieve "3-in-1" device functionality (i.e., integrated sensing, processing, and display).

Figure 10A:
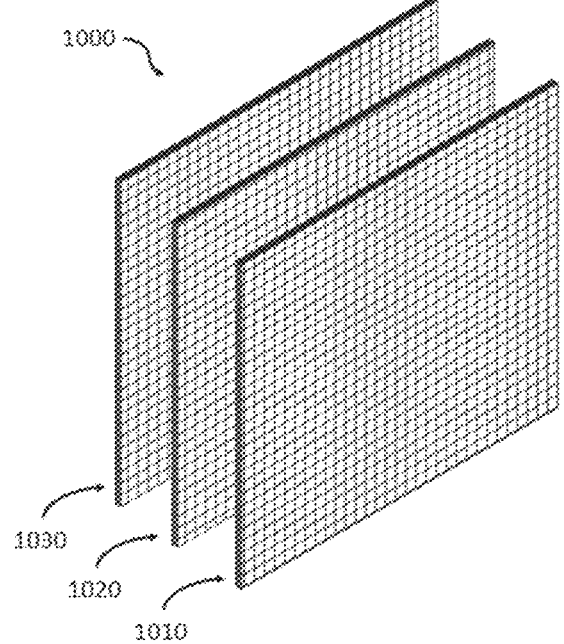
FIGS. 10A and 10B show a schematic representation of an integrated neuromorphic computing device, imaging device, and/or display device according to embodiments disclosed herein.
Figure 10B:
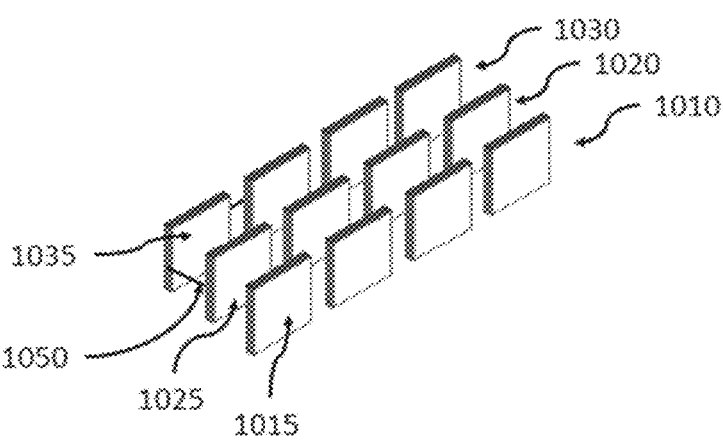

FIGS. 10A and 10B show a perspective schematic representation of a device according to embodiments disclosed herein. FIG. 10B shows an enlarged view of representative components in the layers shown in FIG. 10A. Although only a single row of four layered components is shown for ease of illustration, an actual device may include any number of components as illustrated, arranged in any desired dimension array. Similarly, although the layers are shown having the same number of individual components 1015, 1025, 1035, there need not be a one-to-one correspondence between these components, and any number and arrangement of components may be used.

The device 1000 includes an imaging device 1010 having an arrangement of optical sensors 1015. The optical sensors may be, for example, organic sensors (though typically not TFT sensor technologies that do not respond well to light and thus result in poor phototransistors or cannot be used for phototransistor applications), such as OLEDs, organic photovoltaic cells, or other organic sensors, and may be disposed in an array, such as a two-dimensional grid as is used in digital cameras and other similar sensors.

The device 1000 also includes a neuromorphic computing device 1020 formed from a plurality of artificial neurons 1025 as previously disclosed with respect to FIGS. 3-6. The artificial neurons may include one or more thin-film integrated optical components such as OLEDs, as previously disclosed, which may be emissive, modulating, or detecting components. As used herein, "thin-film integrated" optical components include inorganic light-emitting diodes (LEDs), OLEDs, liquid crystal display components, quantum dot emissive components, electroluminescent devices, electrochromic devices, and, more generally, any emissive, modulating, or detecting component that is fabricated layer-upon-layer over an arbitrary substrate. That is, fabrication of the component does not require any specific type or form of substrate. Such arbitrary substrates may include, for instance, glass, a silicon microelectronic chip, a flexible substrate, a flexible polymer, a metal film, a chip containing a traditional photonic integrated circuit, and more generally, any material able to provide mechanical support and whose characteristics or electronic properties may not be required for the device to operate. In contrast, non-thin-film integrated devices include "traditional" integrated photonic circuits. For such devices, the emissive, modulating, and/or detecting components are at least partially defined in the substrate, such that substrate characteristics and/or quality is critical to operation of the non-integrated component, and the resulting component is not fully deposited layer-by-layer, instead being etched and implanted out of an initial specific high quality functional substrate. This includes silicon-on-insulator integrated photonic circuits and III-V integrated photonic circuits such as indium phosphide and gallium arsenide.

The device also may include a display 1030 formed from an arrangement of emissive components 1035, such as inorganic light-emitting diodes (LEDs), OLEDs, liquid crystal display components, quantum dot emissive components, electroluminescent devices, electrochromic devices, and the like. The emissive components 1035 also may provide some or all of the artificial neurons 1025. That is, the display 1030 may also function sequentially or concurrently as the neuromorphic processor 1020 as previously disclosed. Similarly, integrated optical sensors in the sensor 1010 may form a portion of the neuromorphic processors, for example by receiving optical inputs as previously disclosed. In other words, each of the artificial neurons 1025 may include at least one of the optical sensors 1015 in the imaging device 1010, or the neurons may exclude the sensors; and each artificial neuron 1025 may include at least one emissive component 1035, or the neurons may exclude the emissive components. In embodiments in which the artificial neurons 1025 exclude one or both of the sensors 1015 and/or the emissive components 1035, those components may be included in the device in a separate layer or other arrangement. Such arrangements allow for artificial neurons in the neuromorphic computing device to also act as a display device, such as an active-matrix display.

The various components may interoperate via interconnects 1050, which may be electrical, optical, or a combination thereof. The interconnects may be physically distinct from the components that they connect, or they may be integrated into those components. For example, a sensor component 1015 may provide an optical input to one or more artificial neuron 1025, and/or an integrated emissive component 1035 may provide an optical output for one or more artificial neurons 1025 as previously disclosed.

As previously disclosed, multiple inputs to each artificial neuron may be weighted and may be summed or otherwise integrated at the neuron. As used herein, unless specified explicitly or required by context, the terms "integration," "integrated," or similar variations encompasses summation or any other suitable combination of the relevant values, as the terms would be understood in the art; similarly, "to integrate inputs" or "to integrate outputs" includes the act of summing or otherwise combining those values as the terms would be understood in the art. For clarity of description, an integration operation or a result of an integration may be referred to as a "sum" regardless of the specific technique used to calculate the result, such that a device "configured to sum" inputs may do so via any suitable integration technique.

Optical sensors within the artificial neurons, whether provided by the imaging device or not, may integrate outputs of the integrated emissive optical components, whether or nor provided by the display components. Further, each output of each integrated emissive optical component may be determined by one or more inputs to the optical component, such as previously disclosed with respect to FIGS. 3-6. The inputs also may be weighted as previously disclosed with respect to FIGS. 3-6.

In devices as disclosed herein, in which a neuromorphic computing device and a display are provided by the same components, the display action of the screen can be decoupled from its refresh rate. This results in two effective rates existing: one for loading the low-dimensional data (now not necessarily at each pixel), and one for updating the weights of the neural processing so that codes can span the entire display space. This can enable features such as faster "effective" refresh rates for the display, i.e., how quickly images shown on the display can change, and low-bandwidth image streaming such as streaming high-quality Bluetooth video. Within a given weight space, only the code data needs to be communicated. The device could switch between locally-stored sets of weights when prompted with, again, low-dimensional streamed data. In such a configuration, the sets of weights could be identified with, for example, integers. That is, in contrast to conventional displays in which all pixels must be addressed at each refresh rate to update the displayed image, embodiments disclosed herein may use a smaller amount of data that is sent only to selected pixels, and the pixels are able to communicate with each other to reconstruct a complex image from the smaller amount of data conditioned on the interconnection strengths (weights). This may allow the display to change the displayed image using less data sent to the display than would otherwise be required, hence faster. However, to span the full set of possible images, it may be necessary to update the weights occasionally, and this change is communicated to the display. Since there is one weight per connection, the amount of data required to communicate the change may be high and thus may seem to nullify the benefit obtained by using the smaller amount of data initially. However, if the same sets of weights are reused often, the weights can be locally stored on the display and changing between different sets of (likely predetermined) weights can be triggered by sending smaller amounts of data instead of one unit of data per connection. In any case, two refresh rates appear, one relating to how fast new codes are sent to display new images (a faster rate), and one relating the how quickly the smart display can be reconfigured to change its input-output relationship (a slower rate), although the latter can be accelerated with local weight storage on the display.

Similar arrangements may be used with conventional (non-neuromorphic) processors. As described above, the update in the display, in addition to current scanline driving, can have other factors governing each pixel. Traditionally, the input to each pixel is simply three voltages corresponding to brightness of each sub-pixel. Embodiments disclosed herein may make use of an enhanced pixel architecture with the following characteristics: each pixel may be configured to respond to a set of instructions, rather than raw data; and pixel instructions may trigger a pixel update whose rule depends on the current or past outputs of neighboring pixels, i.e., the value displayed by a pixel may be determined based on concurrent or prior adjacent pixel values. Notably, a relatively small set of such instructions may lead to emergent behavior in the patterns that can be exhibited by the display. For example, if pixels are instructed to update to a color that is the average of neighboring pixels, the resulting display corresponds to a Gaussian blur applied to the entire screen. In some embodiments, this may require each pixel's circuitry to store not only data, but also programs.

In another embodiment, the display may be subdivided into a number of regions and the low-dimensional data may be input to those regions rather than the entire screen. To ensure that information flows to every region with deterministic and equal latency, the methodology of clock networks in integrated circuit chips may be used. In this manner, it becomes possible to achieve a low-latency display which dynamically trades-off latency and data throughput in real-time. For example, if the display needs a full refresh, it requires a transfer of data corresponding to each pixel, jeopardizing latency; however, if it needs to have minor changes, it requires a transfer of a small amount of data, which could go directly to the region which requires the change in the minimum amount of time.

As a specific example, consider a display responsible for representing a static 3D picture in VR glasses. As the user moves their head, the display refreshes and updates its information based on their pose estimation. Since the picture is static, the image only needs to be "moved" across the display at any particular time. In that case, instead of providing full frames to the display, only "new pixels" that would appear around its perimeter, along with a uniform "translation" instruction to all pixels, may be provided. This strategy reduces latency because of two reasons: first, it reduces the amount of data needed for refresh, from 4 k×2 k pixels to 4 k+2 k pixels (equivalent to two edges) per refresh; second, the global translation instruction can reach every pixel in less time than a full frame update, scanline by scanline.

In embodiments in which the neuromorphic computing device artificial neurons provide both the imaging device, such as a camera, and the output display, the device may act not only on present or past display output, but also sensing inputs. A full autoencoder may be used to take an external image at every pixel location, run it through a deep network, and output an image with the desired transformation at the output display components, such as individual OLED pixels. The low-dimensional code may also be compressed enough it can be manipulated digitally locally or elsewhere before being sent back to the decoder. Cellular neural networks may fall in this category as well, where an input directly modulates what is output. Different templates (weight matrices) actuated at the refresh rate would change the input-output rules. The difference is only in how the neurons are networked.

In some embodiments, external data and sensor data may be used synergistically, either as a combined input to a network or one modulating network weights and the other being the input data, for example as described below with respect to FIGS. 13-14.

In some embodiments, the neuromorphic computing device may perform various processing and/or pre-processing of image data captured by the imaging device, which processing may provide a visual output based on the captured image data. For example, the neuromorphic computing device may provide a VR or AR image or overlay, which may be combined with the raw image data captured by the imaging device.

As noted above, the close coupling of the artificial neurons 1025 with the imaging device sensors 1015 and/or the display components 1035 may allow for significantly-reduced latency compared to conventional devices that require separate capture, analysis, and/or display devices. For example, the latency between initial acquisition of image data by the imaging device 1010 and output by the neuromorphic computing device 1020 may be less than 20, 10, 5, 2, or 1 ms which then implies that a neuromorphic system as disclosed herein is capable of processing and interpreting images captured by the imaging device and providing a visual output based on that interpretation in not more than 20, 10, 5, 2, or 1 ms, respectively. In some embodiments, real-time or near real-time processing may be achieved. As used herein, "real-time" processing or processing that occurs "effectively in real time" means that there is no delay between image capture and processing or between processing and result output other than the delay necessary to transmit information over the relatively short distance between the components in embodiments where the artificial neurons 1025 do not include the imaging sensors 1015 and/or the display components 1035. Similarly, embodiments disclosed herein may allow for latency between acquisition of image data by the imaging device 1010 and display of the visual output of the neuromorphic computing device 1020 by the display 1030 of 20, 10, 5, 2, or 1 ms. In some embodiments, the display of output image data by the display 1030 may occur in real time or near real time. As described in further detail below, the significantly shorter latencies achievable with embodiments of the present disclosure relative to conventional devices is possible due to the tight coupling of artificial neurons to other components or, in some embodiments, dual or triple use of the artificial neurons as imaging sensors and/or display components. Such low latencies generally are not achievable in conventional devices that rely on entirely separate imaging, processing, and display devices, even where such devices are integrated into a single housing and/or use common fabrication substrates.

Embodiments disclosed herein also may allow for improvements in processing and data transfer bandwidth. Modern image capture devices are capable of capturing very large amounts of data very quickly. Processing such data for display, VR/AR, or other uses in conventional systems accordingly requires large amounts of processing power, data transfer bandwidth, and other associated resources. In contrast, combined devices as disclosed herein also may provide for greatly reduced image data size. For example, for image data captured by the imaging device with a total storage size D (and hence, conventionally requiring at least bandwidth sufficient to rapidly transmit an amount of data D), a neuromorphic computing device operating in conjunction with an imaging device and/or display device as disclosed herein may be capable of outputting imaging data much less than D, which is still sufficient to display the image data captured by the imaging device. In some embodiments, the neuromorphic computing device may output imaging data not more than 0.0001D, 0.001D, 0.01D, 0.02D, 0.05D, 0.075D, 0.1D, 0.2D, 0.3D, 0.4D, or 0.5D. Accordingly less bandwidth is thus required to transmit the image data to an external display (if used), and relatively lower processing resources are required by the external display or the combined display panel to process and display the image data.

Figure 11:
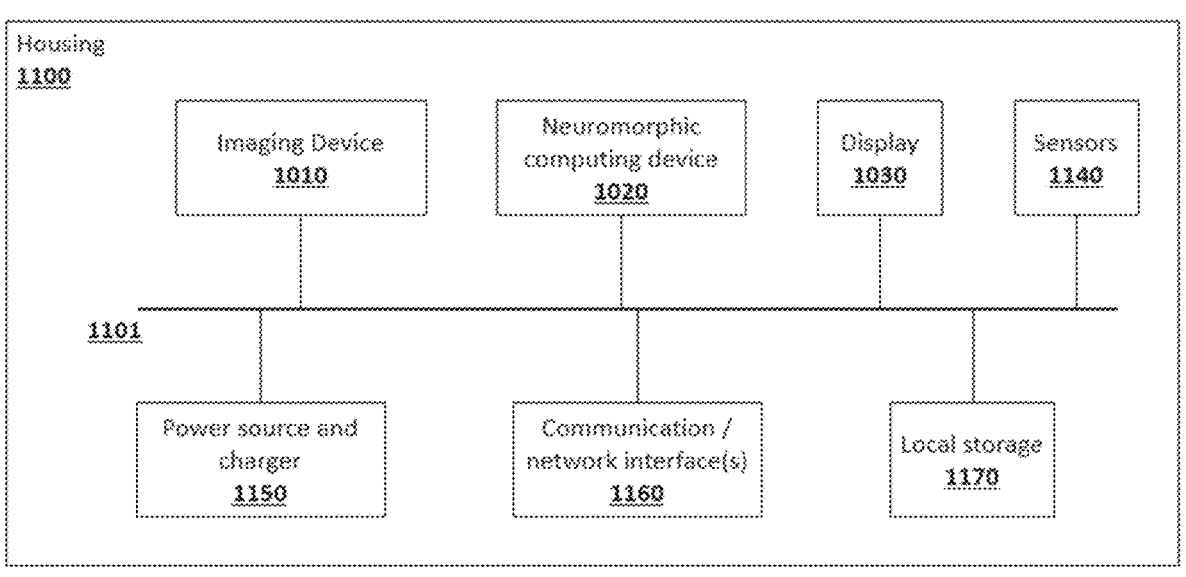
FIG. 11 shows a schematic representation of a device according to embodiments disclosed herein.
Figure 12:
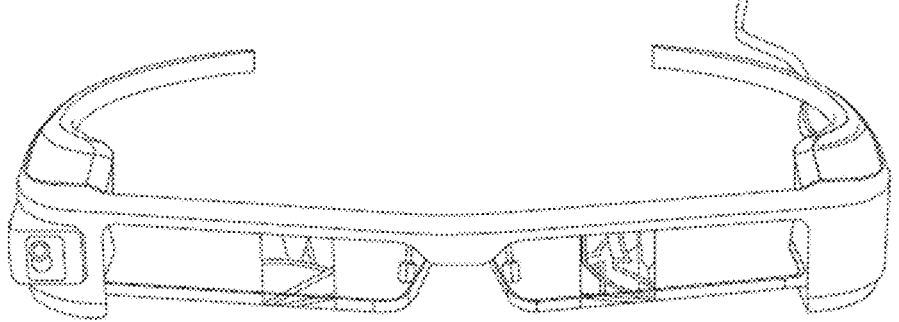
FIGS. 12 and 13 show examples of specific housings and devices as shown in FIG. 11.
Figure 13:
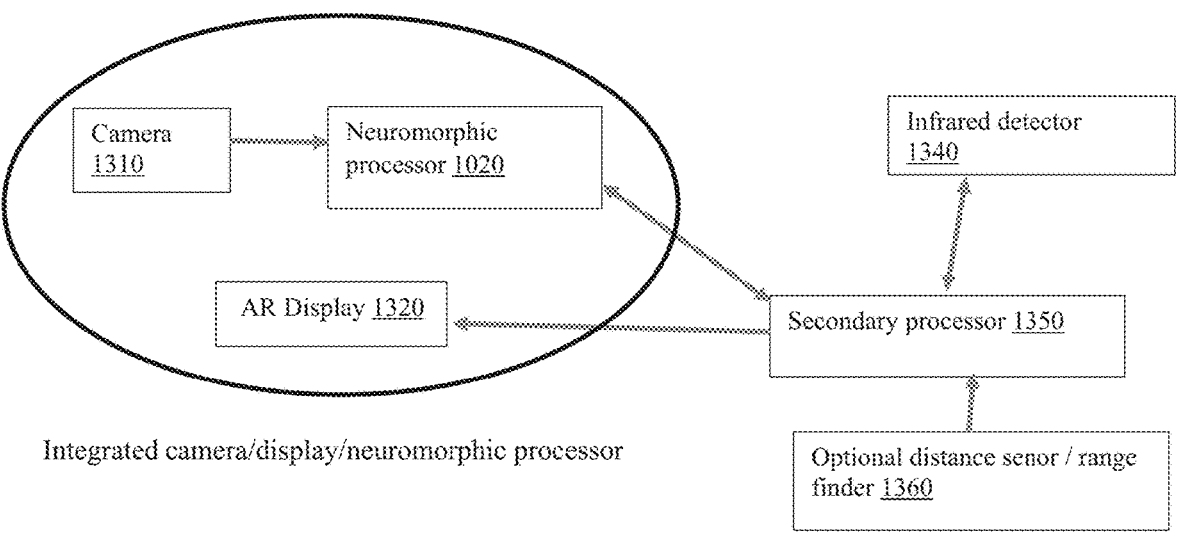
Figure 14:
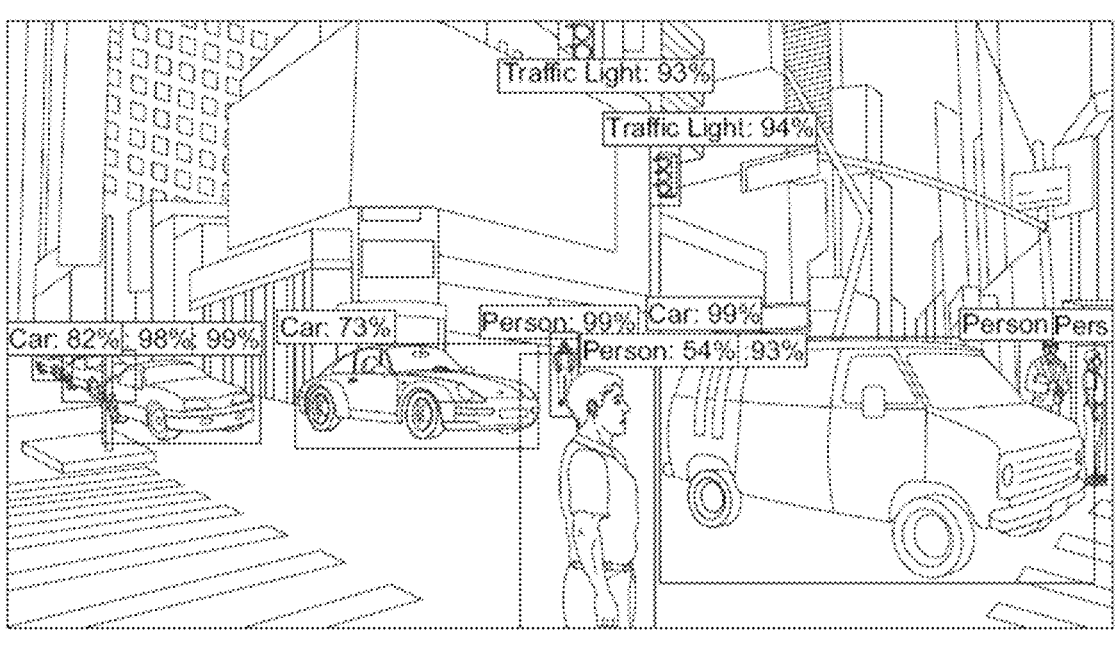
FIG. 14 shows an example of an image generated by an AR device according to embodiments disclosed herein.

FIGS. 11-13 show example devices that include a neuromorphic computing device as disclosed herein. FIG. 11 shows a schematic representation of a general device as disclosed herein, with FIGS. 12 and 13 showing examples of specific devices.

The device may be contained in a housing 1100, such as the eyewear shown in FIG. 12, or any other suitable housing. The housing may be specific to uses of the device as disclosed herein, such as AR or VR eyewear as shown in FIG. 12, or a more general-purpose device housing such as a phone, tablet, or the like. The device includes an imaging device 1010, such as a digital camera 1310, a neuromorphic computing device 1020, and a display 1030 such as an AR display 1320, as previously disclosed. The neuromorphic computing device 1020 may include the imaging device 1010 and/or the display 1030 as previously disclosed herein. In some embodiments, other component devices may be included. For example, the device may include a built-in power source 1150 such as a thin-film battery or the like. The power source 1150 may include a charging source, such as solar panels, wireless/near-field charging receivers, or combinations thereof. Alternatively or in addition, the device may include a standard or proprietary connection to allow for external charging, such as by way of a DC converter or similar charging mechanism.

The device may include a communication interface 1160, such as Wi-Fi, Bluetooth®, or other wireless or wired connections used in the art. The device also may include local storage 1170 such as a solid-state drive or the like. Components may communicate with one another, such as to send data to and/or receive data from the devices 1010, 1020, 1030, via a common bus 1101 or individually-isolated equivalents.

In some embodiments, additional sensors 1140 such as radar, lidar, range finders, ultrasonic sensors, infrared sensors, and the like may be used to obtain additional data that may be used, for example, in AR/VR-type applications.

FIG. 12 shows an example embodiment in which the housing is provided by eyewear, such as smart glasses. In such an embodiment, the imaging device (camera) and neuromorphic computing device may be housed in a side portion of the device, while the lenses may provide a surface for displaying an image generated by the neuromorphic processor and/or the imaging device. For example, AR or VR images may be displayed by OLEDs or other similar display elements disposed within the lenses.

FIG. 13 shows a schematic representation of a device that may be used, for example, in healthcare and other similar uses. The device may include a camera 1310, neuromorphic computing device 1020, and an AR display 1320 as previously disclosed. Use of AR glasses such as shown in FIGS. 12-13 may enable a wearer both to detect people nearby with elevated body temperatures and display such information to the wearer. Such as device may be particularly useful, for example, in detecting diseases such as COVID-19, the flu, and others that may be rapidly spread when an individual comes into close physical contact or proximity with infected people, and which can be detected at least in part based upon elevated body temperature. An integrated AR device based on using thin film devices such as OLED, may act as a camera and provide neuromorphic processing as previously disclosed. Such a device may be used, for example, to detect people close to the user, measure their body temperature via an infrared detector, and display that information back to the user, such as via an integrated display, without requiring bulky components or high power consumption and data communication requirements, enabling the fabrication of a wearable AR device to perform these functions, and one that is suitable for consumer applications.

For an AR device to highlight to the wearer/user of people close by who have elevated temperatures, it may include a waveguide and display so that images can be rendered on the glasses for the user to see and interpret, such as shown in FIG. 12. A camera 1310 may be used to analyze the real world through the AR glasses. IR detection arrays 1340 can be used to record the temperature of objects seen by the IR arrays. For example, to determine the temperature of objects around 38 C which emit at infrared wavelengths around 10 um-12 um, devices such as bolometers have been developed. Current commercial products can readily resolve the temperature of objects to less than 0.1 C. Bolometers can be based on MEMS fabrication processes on silicon wafers.

The infrared detection array 1340 may be a standard design bolometer, for example fabricated using MEMS principles on a crystal silicon substrate. The infrared sensor also may be integrated into a single device with the camera 1310, neuromorphic processor 1020, and/or the display 1320. As previously disclosed, the camera 1310, neuromorphic processor 1020, and/or display 1320 may be a single device, such as where artificial neurons of the neuromorphic processor provide imaging and/or display elements of the camera and display, respectively. In some embodiments, some artificial neurons may be used concurrently as infrared sensor components, in a similar fashion to the concurrent use of artificial neurons as optical sensors as previously disclosed. The AR headset also may include an optical camera 1310 to image the real world through the AR glasses as previously disclosed. To simplify the bolometer requirements in terms of resolution, the device may use the visual camera 1310 to detect objects in sight of the user, after which the neuromorphic processor 1020 may perform preprocessing of the visual image as previously disclosed, to highlight people and faces in close proximity to the wearer. Proximity may be determined, for example, based upon the size of the person in the image or by a range finder 1360 which also may be included in the device. Once people have been identified as "within range" (of possible virus transmission) the bolometer may be activated to measure the temperature of the people with the neuromorphic processor identifying their location to the bolometer. The bolometer then may be used at a lower resolution than the optical camera and need only be read at a lower fame rate, perhaps 10 Hz or even 1 Hz.

The bolometer or other infrared detector may be fitted into the AR glasses as a stand-alone device, or else it may be implemented as a set of infra-red sensing pixels included in and on the a silicon substrate that forms the basis of a microOLED display integrated with a neuromorphic processor and visual camera as previously disclosed. A bolometer may have only relatively low resolution requirements, since the visual camera and neuromorphic processor may be used to perform the initial indentification of the location of the heads of people within a specified range of the user as previously disclosed (i.e. the regions of interest to be measured for infrared emission to measure their temperature). At that point the infrared sensor may simply be used to measure the temperature of those regions once they have been identified. When no people are in close proximity to the user, the infrared detector may be turned off or placed in a low-power "sleep" mode to reduce power consumption.

In some cases, devices such as shown in FIGS. 12-13 may preferably use Si substrates to provide need thermal isolation between the detection film and the substrate. For example, vanadium oxide and/or amorphous silicon detection films may be used to detect IR radiation, and thus may be suitable for use in a bolometer or otherwise in a device to measure body temperature.

The use of a neuromorphic processor integrated with a visual camera as previously disclosed may be particularly beneficial in such devices. This combination may enable rapid and accurate facial recognition or pre-processing of such information to be performed without the power and bandwidth requirements required in conventional systems, which would need to transfer complete video information from a camera to a remote processor to detect the presence of people, correlate with their body temperature as measured by an infrared detector, and then relay that information back to the display for AR projection to the user. In the approach disclosed herein, the data rate to any outside system reasonably may be reduced by 90%, or more, in some embodiments up to 99% or 99.9%, or not required at all since the device may operate without external processing.

In operation, the visual camera 1310 may record the real world seen by the user through the AR glasses, such as shown in FIG. 12. In an example of rapid preprocessing of image data previously described herein, the integrated neuromorphic processor 1020 may detect areas of image data obtained by the camera 1310 to be analyzed for temperature based on proximity of people and recognition of their features and shape. This information may be fed to a secondary processor 1350, which only requires relatively low bandwidth information. The secondary processor 1350 then may control the infrared detector 1340 to record temperatures in the regions of interest if people close to the user are detected. A range finder or other distance detector 1360 as previously disclosed also may be used to identify the distance of people to the user/wearer. After temperatures are monitored, the processor 1350 then may provide overlay information to the display 1320 which can project the information back to the user. FIG. 14 shows an illustrative example of the image seen by the user. The processor also may combine IR information with optical (video) information.

The integrated nature of such as device, and/or the availability of rapid preprocessing as described herein may allow for additional features that are not readily achievable using conventional devices and systems. For example, the neuromorphic processor may be used to recognize names and individual people within the field of view of the device.

Other components may be included as well. For example, a second IR detection system may be oriented on the glasses or other similar device to point backwards in order to capture 360-degree information on nearby individuals, for example to alert the user to unseen health or safety risks. External communication channels may be used, such as via network interfaces 1160, for example to provide alerts to local phones or remote devices via the Internet or other communication network.

In some embodiments, the entire device including infrared detector, secondary processor (if used), and distance sensors may be self-contained, such as within a device as shown in FIG. 12, such that no external data connection needed for image interpretation and device operation.

The AR display may be a phosphorescent or other OLED. Moreover, the individual or combined camera, display, and/or neuromorphic processor may be based on thin film components as previously disclosed.

It is understood that the various embodiments described herein are by way of example only, and are not intended to limit the scope of the invention. For example, many of the materials and structures described herein may be substituted with other materials and structures without deviating from the spirit of the invention. The present invention as claimed may therefore include variations from the particular examples and preferred embodiments described herein, as will be apparent to one of skill in the art. It is understood that various theories as to why the invention works are not intended to be limiting.

We claim:

1. A device comprising:
   an imaging device comprising a plurality of first optical sensors disposed in a two-dimensional array; and
   a neuromorphic computing device comprising a plurality of artificial neurons, the neuromorphic computing device configured to process image data captured by the imaging device, each of the plurality of artificial neurons comprising one or more integrated emissive optical components;
   wherein integration of the inputs to each artificial neuron of the plurality of artificial neurons is performed in the each neuron;
   wherein the optical sensors in the imaging device and the integrated emissive optical components in the neuromorphic computing device are formed from organic optical sensors, organic photovoltaic cells, OLEDs, or a combination thereof; and
   wherein the neuromorphic computing device provides image output data having a resolution different than the image data captured by the imaging device.

2. A device comprising:
   an imaging device comprising a plurality of first optical sensors disposed in a two-dimensional array; and
   a neuromorphic computing device comprising a plurality of artificial neurons, the neuromorphic computing device configured to process image data captured by the imaging device, each of the plurality of artificial neurons comprising one or more integrated emissive optical components;
   wherein integration of the inputs to each artificial neuron of the plurality of artificial neurons is performed in the each neuron; and
   wherein the optical sensors in the imaging device and the integrated emissive optical components in the neuromorphic computing device are formed from organic optical sensors, organic photovoltaic cells, OLEDs, or a combination thereof.

3. The device of claim 2, further comprising a display configured to display image data captured by the imaging sensor, output of the neuromorphic computing device, or a combination thereof.

4. The device of claim 3, wherein the display comprises a plurality of pixels, each pixel being driven by a set of instructions that indicate when the pixel should update based on current outputs of neighboring pixels, past outputs of neighboring pixels, or a combination thereof.

5. The device of claim 2, further comprising an infrared sensor, wherein the device is configured to determine a body temperature of the person based upon data from the infrared sensor.

6. The device of claim 2, wherein at least some of the plurality of artificial neurons operates as pixels or sub-pixels in an active-matrix display.

7. The device of claim 2, wherein each of the plurality of artificial neurons comprises at least one of the plurality of first optical sensors.

8. The device of claim 2, wherein each of the plurality of artificial neurons comprises:
   at least one second optical sensor configured to integrate outputs of the one or more integrated emissive optical components;

wherein each output of each of the one or more integrated emissive optical components is determined by one or more inputs to the each integrated emissive optical component.

9. The device of claim 8, wherein each output of each of the one or more integrated emissive optical components is determined by one or more weighted inputs to the each integrated emissive optical component.

10. The device of claim 8, wherein the at least one second optical sensor configured to sum outputs is one of the first optical sensors disposed in the two-dimensional array.

11. The device of claim 2, wherein the processing of the image data captured by the imaging device by the neuromorphic computing device comprises providing a visual output based on the imaging data.

12. The device of claim 11, wherein at least some of the plurality of artificial neurons operates as pixels or sub-pixels in an active-matrix display.

13. The device of claim 11, wherein the visual output is provided as an overlay of an image output provided by the imaging device.

14. The device of claim 11, wherein a latency between acquisition of image data by the imaging device and output by the neuromorphic computing device is less than 20 ms.

15. The device of claim 11, wherein a latency between acquisition of image data by the imaging device and display of the visual output is less than 20 ms.

16. The device of claim 2, wherein, for a portion of image data captured by the imaging device having a data size D, the neuromorphic computing device is capable of outputting imaging data having a data size not more than R that is sufficient to display the image data, wherein R is not more than 0.1D.

17. An electronic device comprising:
    a device comprising:
       an imaging device comprising a plurality of optical sensors disposed in a two-dimensional array; and
       a neuromorphic computing device comprising a plurality of artificial neurons, the neuromorphic computing device configured to process image data captured by the imaging device, each of the plurality of artificial neurons comprising one or more integrated emissive optical components;
    wherein summation or integration of inputs to each artificial neuron of the plurality of artificial neurons is performed in the each neuron; and
    wherein the optical sensors in the imaging device and the integrated emissive optical components in the neuromorphic computing device are formed from organic optical sensors, organic photovoltaic cells, OLEDs, or a combination thereof.

18. The electronic device of claim 17, wherein the device is at least one type selected from the group consisting of: a flat panel display, a curved display, a computer monitor, a medical monitor, a television, a billboard, a light for interior or exterior illumination, signaling, or a combination thereof, a heads-up display, a fully or partially transparent display, a flexible display, a rollable display, a foldable display, a stretchable display, a laser printer, a telephone, a cell phone, tablet, a phablet, a personal digital assistant (PDA), a wearable device, a laptop computer, a digital camera, a camcorder, a viewfinder, a micro-display that is less than 2 inches diagonal, a 3-D display, a virtual reality or augmented reality display, a vehicle, a video walls comprising multiple displays tiled together, a theater or stadium screen, a drone, eyeglasses, an autonomous vehicle, a smart camera, a health-monitoring device, a smart sensor, and a sign.

* * * * *